(12) United States Patent
Anderson et al.

(10) Patent No.: US 10,824,143 B2
(45) Date of Patent: Nov. 3, 2020

(54) AUTOSCRUBBER CONVERTIBLE BETWEEN MANUAL AND AUTONOMOUS OPERATION

(71) Applicant: A&K Robotics Inc., Vancouver (CA)

(72) Inventors: Matthew Henry Anderson, Vancouver (CA); Anson Yan Shun Kung, Richmond (CA); Jacob Michael Perron, Vancouver (CA); Alexander Joseph Yuen, Richmond (CA)

(73) Assignee: A&K Robotics Inc., Vancouver (CA)

( * ) Notice: Subject to any disclaimer, the term of this patent is extended or adjusted under 35 U.S.C. 154(b) by 53 days.

(21) Appl. No.: 16/152,984

(22) Filed: Oct. 5, 2018

(65) Prior Publication Data

US 2019/0179307 A1    Jun. 13, 2019

Related U.S. Application Data

(63) Continuation of application No. PCT/CA2017/050430, filed on Apr. 7, 2017.

(Continued)

(51) Int. Cl.
| | |
|---|---|
| *G05D 1/00* | (2006.01) |
| *A47L 11/40* | (2006.01) |
| *A47L 11/28* | (2006.01) |
| *B60L 15/20* | (2006.01) |
| *G05D 1/02* | (2020.01) |

(52) U.S. Cl.
CPC ............ *G05D 1/0061* (2013.01); *A47L 11/28* (2013.01); *A47L 11/4011* (2013.01); *A47L 11/4061* (2013.01); *A47L 11/4066* (2013.01); *B60L 15/2036* (2013.01); *G05D 1/0212* (2013.01); *G05D 1/0246* (2013.01); *A47L 2201/04* (2013.01); *B60L 2220/42* (2013.01); *B60L 2240/423* (2013.01); *B60L 2240/46* (2013.01); *B60L 2240/461* (2013.01);
(Continued)

(58) Field of Classification Search
CPC .. A47L 11/4011; A47L 11/30; A47L 2201/04; G05D 2201/0203; G05D 1/0219
See application file for complete search history.

(56) References Cited

U.S. PATENT DOCUMENTS

| | | |
|---|---|---|
| 3,935,922 A | 2/1976 | Cooper et al. |
| 4,278,142 A | 7/1981 | Kono |

(Continued)

FOREIGN PATENT DOCUMENTS

| | | | |
|---|---|---|---|
| CA | 3020184 A1 | * 10/2017 | ........... G05D 1/0061 |
| EP | 0221423 | 5/1987 | |
| WO | 2015041036 | 3/2015 | |

*Primary Examiner* — Ronald D Hartman, Jr.
(74) *Attorney, Agent, or Firm* — Todd A. Rattray; Oyen Wiggs Green & Mutala LLP

(57) ABSTRACT

Autoscrubbers are capable of being operated in a manual (e.g. walk-behind) mode and an autonomous (operator free) mode and capable of switching between such operational modes. Apparatus and methods for steering such autoscrubbers use steering torque mechanisms to apply steering torques independently to left and right drive wheels. Steering systems for autonomous operation may be retrofit onto existing walk-behind autoscrubbers to implement this functionality. The autonomous control capability may not detract appreciably from an operator's ability to use the autoscrubber in a manual (walk-behind) mode.

32 Claims, 19 Drawing Sheets

Related U.S. Application Data

(60) Provisional application No. 62/320,294, filed on Apr. 8, 2016.

(52) U.S. Cl.
CPC .......... *B60L 2260/40* (2013.01); *Y02T 10/645* (2013.01); *Y02T 10/646* (2013.01); *Y02T 10/7275* (2013.01)

(56) References Cited

U.S. PATENT DOCUMENTS

| | | | |
|---|---|---|---|
| 4,700,427 A | 10/1987 | Knepper | |
| 4,949,823 A | 8/1990 | Coutant et al. | |
| 4,953,917 A | 9/1990 | Wittich | |
| 5,044,043 A | 9/1991 | Basham et al. | |
| 5,064,010 A | 11/1991 | Masbruch et al. | |
| 5,213,176 A * | 5/1993 | Oroku | B60B 19/003 180/168 |
| 5,279,672 A | 1/1994 | Betker et al. | |
| 5,284,522 A | 2/1994 | Kobayashi et al. | |
| 5,341,540 A | 8/1994 | Soupert et al. | |
| 5,353,224 A | 10/1994 | Lee et al. | |
| 5,386,742 A | 2/1995 | Irikura et al. | |
| 5,467,500 A | 11/1995 | O'Hara et al. | |
| 5,622,236 A | 4/1997 | Azumi et al. | |
| 5,634,237 A | 6/1997 | Paranjpe | |
| 5,890,558 A | 4/1999 | Keegan | |
| 6,029,761 A | 2/2000 | Gustafson et al. | |
| 6,124,694 A | 9/2000 | Bancroft et al. | |
| 6,389,329 B1 | 5/2002 | Colens | |
| 6,459,955 B1 | 10/2002 | Bartsch et al. | |
| 6,496,754 B2 | 12/2002 | Song et al. | |
| 6,611,120 B2 | 8/2003 | Song et al. | |
| 6,667,592 B2 | 12/2003 | Jacobs et al. | |
| 7,184,586 B2 | 2/2007 | Jeon et al. | |
| 7,251,548 B2 | 7/2007 | Herz et al. | |
| 7,401,425 B2 | 7/2008 | Friberg et al. | |
| 7,438,766 B2 | 10/2008 | Song et al. | |
| 7,634,336 B2 | 12/2009 | Chae et al. | |
| 7,711,450 B2 | 5/2010 | Im et al. | |
| 7,730,980 B2 | 6/2010 | Mayer et al. | |
| 7,894,951 B2 | 2/2011 | Norris et al. | |
| 7,962,283 B2 | 6/2011 | Zhang et al. | |
| 8,095,336 B2 | 1/2012 | Goncalves et al. | |
| 8,116,928 B2 | 2/2012 | Wu et al. | |
| 8,150,650 B2 | 4/2012 | Goncalves et al. | |
| 8,428,776 B2 | 4/2013 | Letsky | |
| 8,463,541 B2 | 6/2013 | Park | |
| 8,489,234 B2 | 7/2013 | Rew et al. | |
| 8,560,119 B2 | 10/2013 | Lee et al. | |
| 8,630,735 B2 | 1/2014 | Myeong et al. | |
| 8,676,498 B2 | 3/2014 | Ma et al. | |
| 8,679,260 B2 | 3/2014 | Hillman, Jr. et al. | |
| 8,706,297 B2 | 4/2014 | Letsky | |
| 8,718,821 B2 | 5/2014 | Chiappetta et al. | |
| 8,725,416 B2 | 5/2014 | Choi et al. | |
| 8,768,511 B2 | 7/2014 | Lee et al. | |
| 8,774,970 B2 | 7/2014 | Knopow et al. | |
| 8,831,851 B2 | 9/2014 | Canuto et al. | |
| 8,849,036 B2 | 9/2014 | Shin et al. | |
| 8,903,160 B2 | 12/2014 | Jeong et al. | |
| 8,903,590 B2 | 12/2014 | Jeon | |
| 8,924,042 B2 | 12/2014 | Kim et al. | |
| 8,948,913 B2 | 2/2015 | Choi et al. | |
| 8,958,937 B2 | 2/2015 | Hillman, Jr. et al. | |
| 9,014,855 B2 | 4/2015 | Teng et al. | |
| 9,058,039 B2 | 6/2015 | Lee et al. | |
| 9,060,658 B2 | 6/2015 | Choi et al. | |
| 9,079,303 B2 | 7/2015 | Abramson et al. | |
| 9,089,249 B2 | 7/2015 | Hung et al. | |
| 9,125,539 B2 | 9/2015 | Kim et al. | |
| 9,128,486 B2 | 9/2015 | Chiappetta et al. | |
| 9,138,116 B2 | 9/2015 | Ko | |
| 9,170,581 B2 | 10/2015 | Bell et al. | |
| 9,174,830 B1 | 11/2015 | Bell | |
| 9,218,789 B1 | 12/2015 | Lininger et al. | |
| 2003/0019070 A1 * | 1/2003 | Field | A47L 11/03 15/320 |
| 2004/0156541 A1 | 8/2004 | Jeon et al. | |
| 2010/0076599 A1 | 3/2010 | Jacobs et al. | |
| 2010/0291843 A1 * | 11/2010 | Strickland | A47L 11/283 451/350 |
| 2011/0082871 A1 | 4/2011 | Peters, II | |
| 2015/0134148 A1 * | 5/2015 | Krausnick | A47L 11/4066 701/2 |
| 2015/0271991 A1 | 10/2015 | Balutis | |
| 2016/0095487 A1 * | 4/2016 | Koura | A47L 9/2868 15/383 |
| 2017/0060137 A1 * | 3/2017 | Shitamoto | G05D 1/0016 |
| 2019/0179307 A1 * | 6/2019 | Anderson | B60L 15/2036 |
| 2019/0208978 A1 * | 7/2019 | Shitamoto | A47L 11/162 |
| 2020/0069132 A1 * | 3/2020 | Eichberger | A47L 9/2826 |

* cited by examiner

AUTOSCRUBBER CONVERTIBLE BETWEEN MANUAL AND AUTONOMOUS OPERATION

RELATED APPLICATIONS

This application is a continuation of PCT international application No. PCT/CA2017/050430 which has an international filing date of 7 Apr. 2017 and claims priority from U.S. application No. 62/320,294 filed on 8 Apr. 2016. PCT application No. PCT/CA2017/050430 and U.S. application No. 62/320,294 are both hereby incorporated herein by reference.

TECHNICAL FIELD

The technology disclosed herein relates to the field of cleaning floors. Particular embodiments provide floor-cleaning apparatus (floor scrubbers) convertible between a manually controlled operational mode and an autonomous operational mode.

BACKGROUND

A conventional floor scrubbing machine is commonly known within the cleaning industry as an "autoscrubber". Common autoscrubbers (known as walk behind autoscrubbers) include handlebars or the like which are gripped by a user to control the movement of the autoscrubber. Prior art autoscrubbers are self-propelled by a single motor coupled to a transaxle which serves as a speed reducer (transmission) for the motor and also as a differential to split torque between the two drive wheels. A user controls the speed of the motor (and the corresponding speed of the autoscrubber) via a suitable control input (e.g. a knob, a slider, or some other suitable form of hand-operated throttle control mechanism). Cleaning functions and other parameters of prior art autoscrubbers (e.g. speed of brush, rate of soap dispensing) are typically set manually by the operator or are configured to operate in correlation to the drive speed. To steer the autoscrubber, the operator physically turns and guides the apparatus by hand by asserting force on the handlebar. Typical prior art autoscrubbers do not include any controllable inputs for facilitating steering by application of different torques to the different drive wheels. Instead, turning such prior art autoscrubbers requires the application of significant force by the user.

There is a general desire to reduce the human user involvement in the operation of autoscrubbers.

There is a desire, in some situations, to provide autoscrubbers that provide autonomous autoscrubbing functionality.

There is a desire, in some situations, to retrofit conventional (manually operated) autoscrubbers to permit autonomous autoscrubbing functionality.

While autonomous operation of an autoscrubber can be advantageous in some circumstances, there are some circumstances (e.g. when there are particular regions of the floor being cleaned that require extra attention, where there are particular regions of the floor being cleaned that are spatially confined, where there are other humans present on the floor being cleaned, where the regions of the floor being cleaned change rapidly and/or the like) where it can be desirable to facilitate manual operation of the autoscrubbing device or to switch between autonomous autoscrubbing functionality and manual operation of the autoscrubber. In some circumstances, there is a desire that such manual operation be as close as possible (in terms of user experience) to the operation of conventional (i.e. manually operated) autoscrubbers.

The foregoing examples of the related art and limitations related thereto are intended to be illustrative and not exclusive. Other limitations of the related art will become apparent to those of skill in the art upon a reading of the specification and a study of the drawings.

BRIEF DESCRIPTION OF THE DRAWINGS

Exemplary embodiments are illustrated in referenced figures of the drawings. It is intended that the embodiments and figures disclosed herein are to be considered illustrative rather than restrictive.

FIGS. 1A, 1B and 1C may be referred to collectively herein as FIG. 1.

operation mode. The FIG. 1 steering system (or components thereof) may be incorporated into FIG. 7 autoscrubber.

Figure 8:
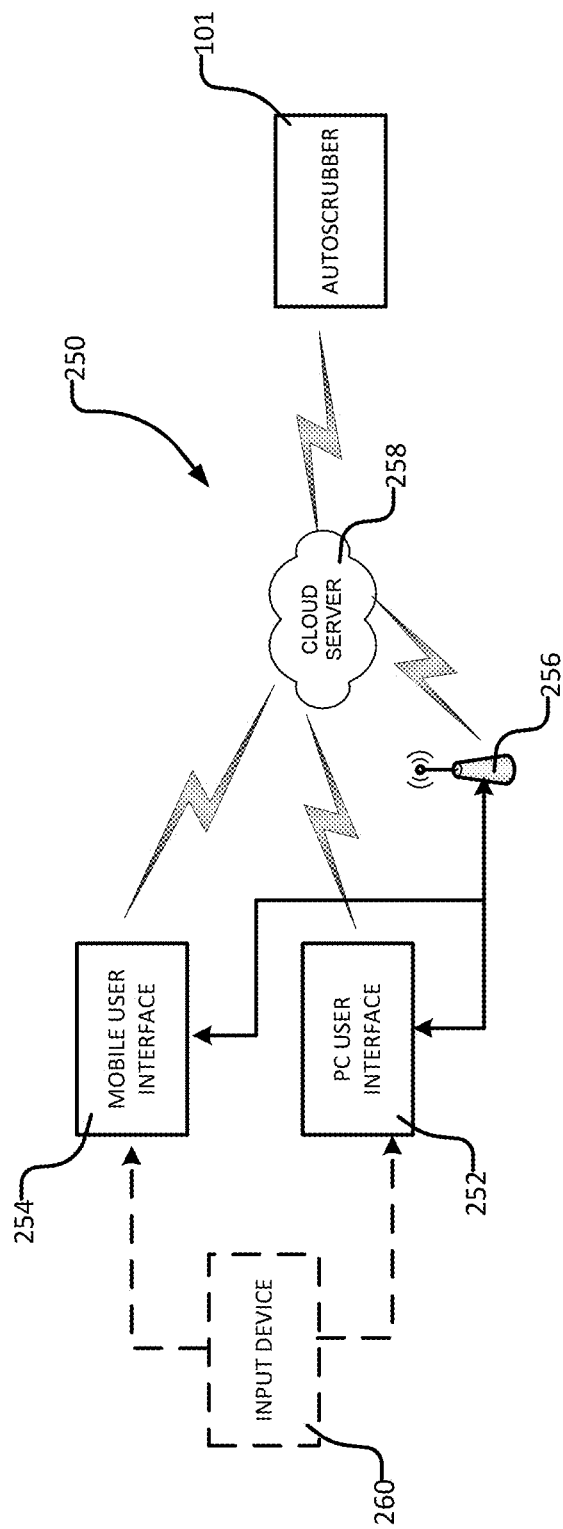

FIG. 8 is a schematic illustration of a remote monitoring system, which may be used in connection with the FIG. 1 autoscrubber according to a particular embodiment.

Figure 9B:
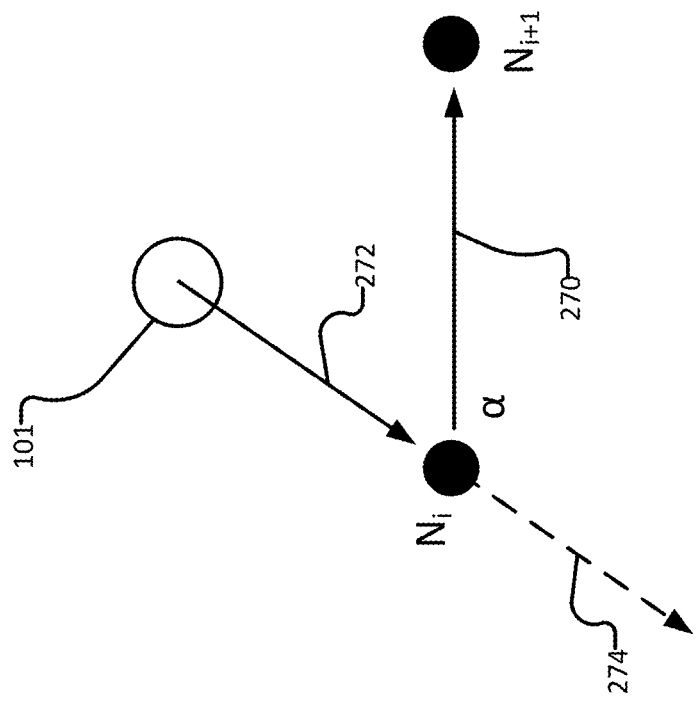
Figure 9A:
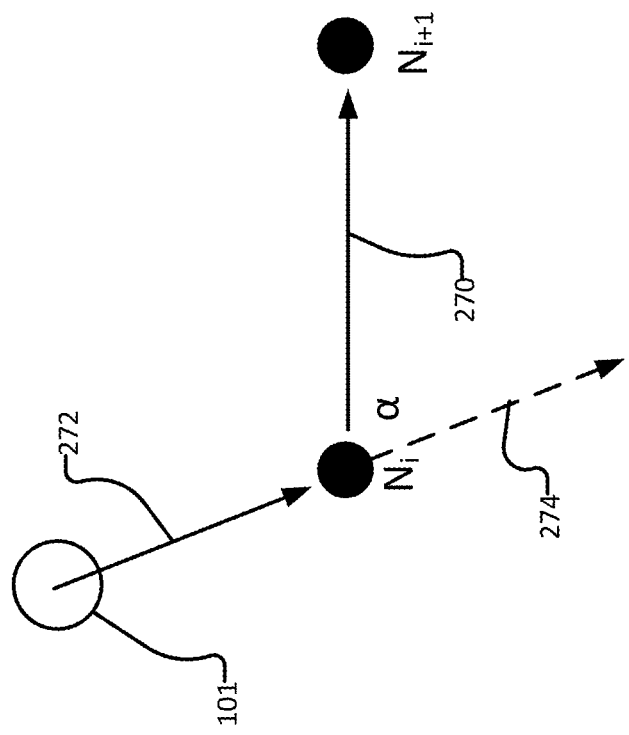

FIGS. 9A and 9B schematically illustrate one technique which may be used for deciding when to start tracking reference observations from the next node in a selected path according to a particular embodiment.

Figure 1A:
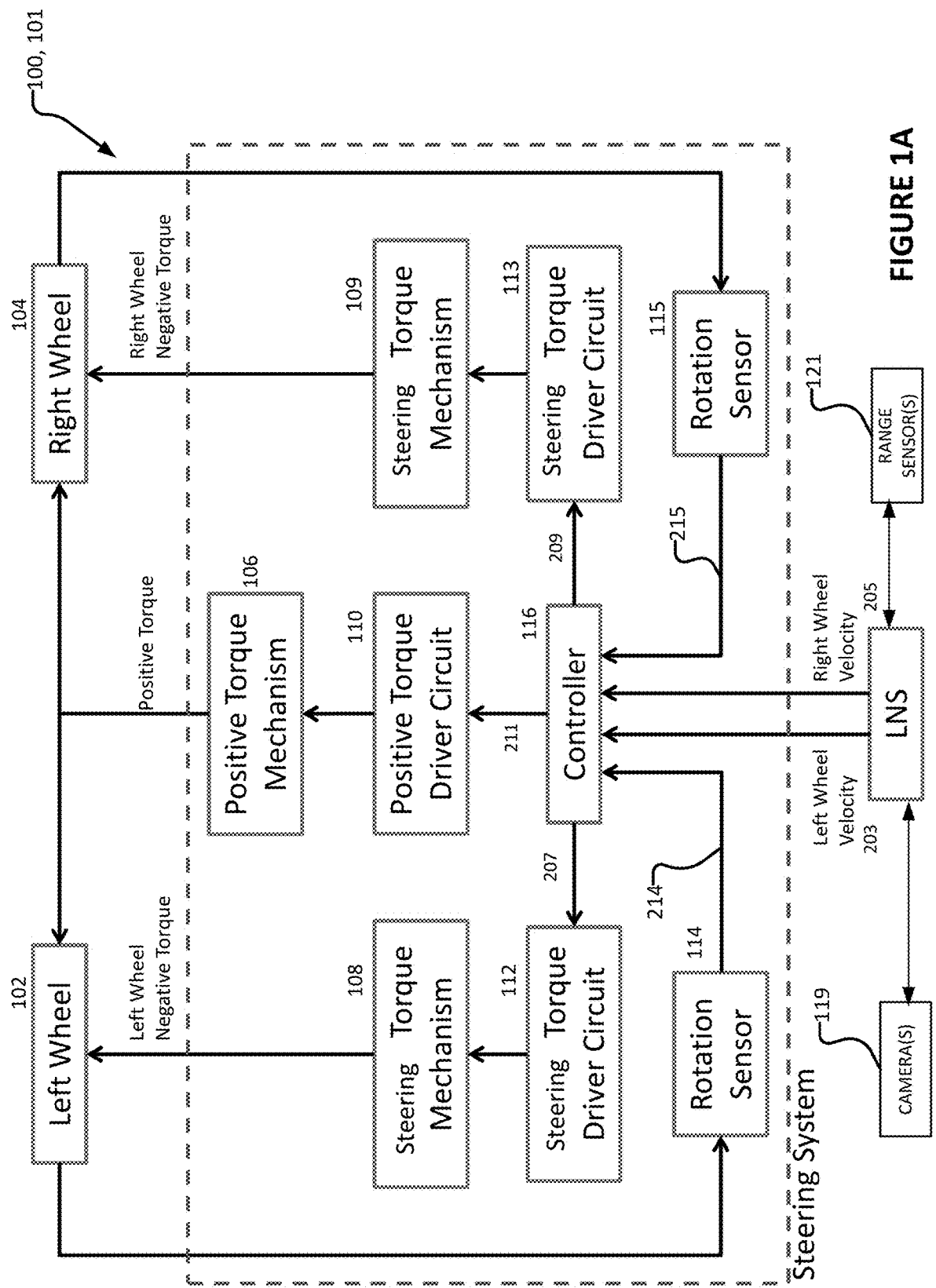
FIG. 1A is a schematic depiction of a steering system for an autoscrubber convertible between a manually controlled operational mode and an autonomous operational mode according to a particular embodiment.
Figure 1B:
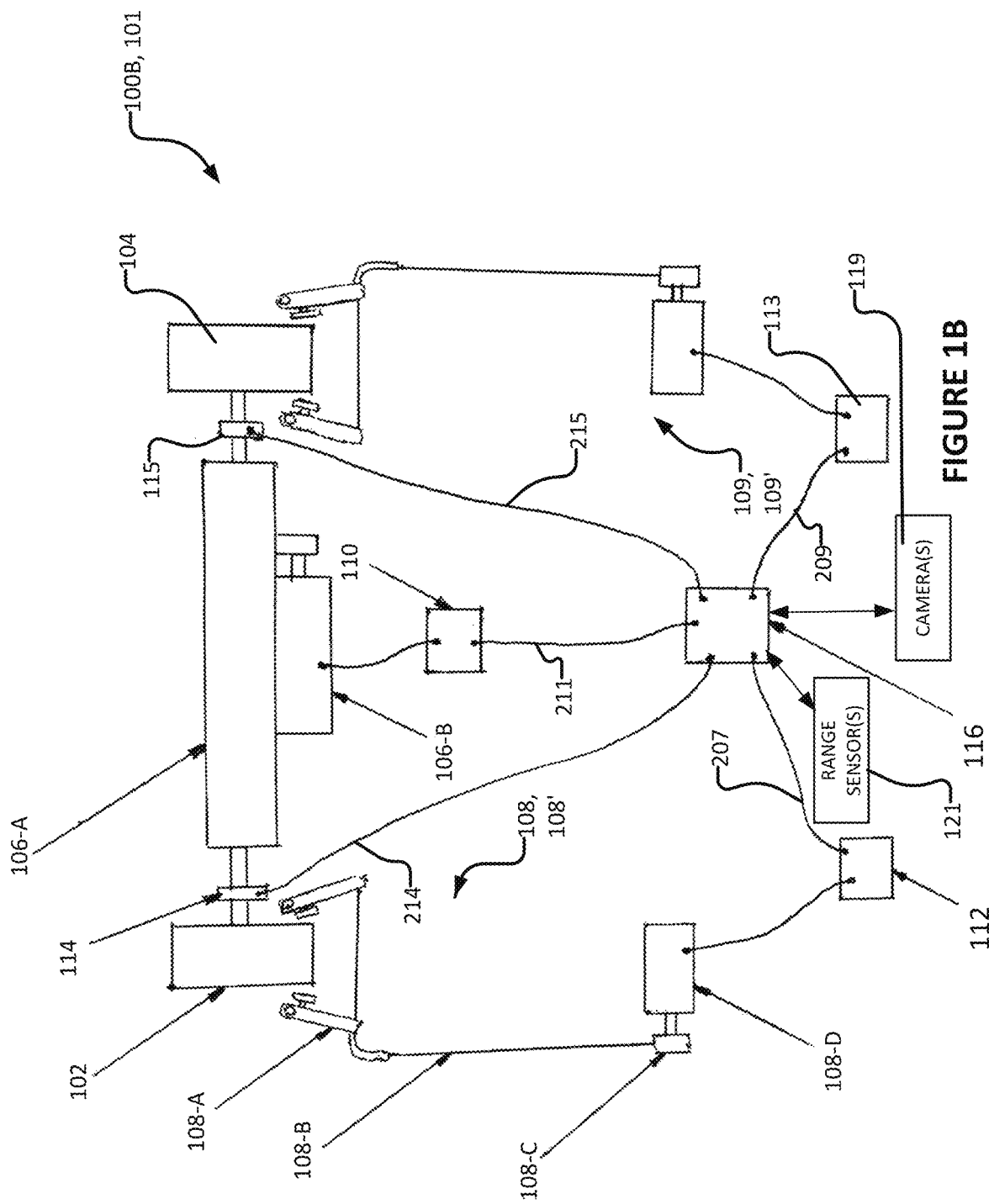
FIG. 1B is a schematic depiction of an example embodiment of the FIG. 1A autoscrubber and steering system.
Figure 1C:
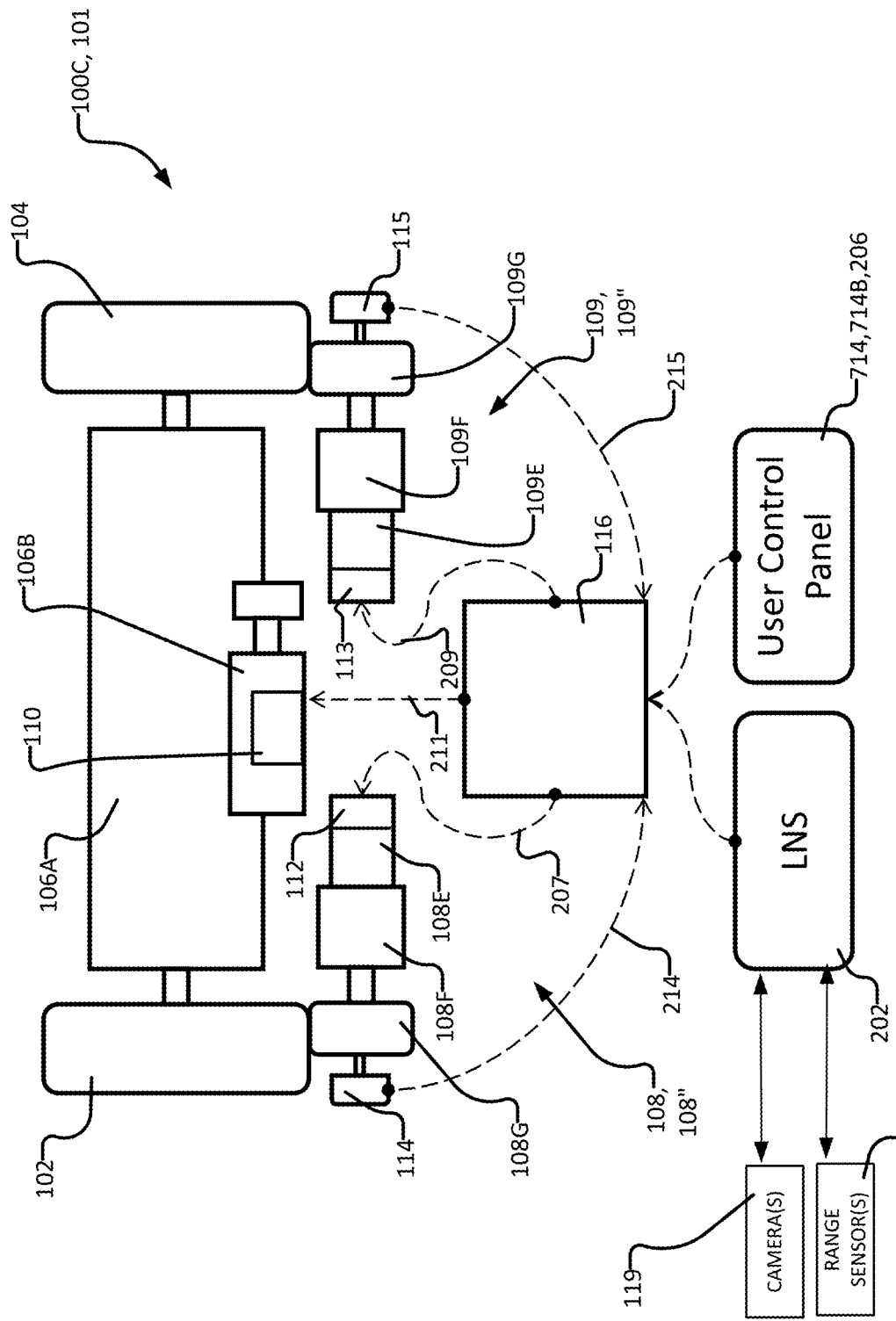
FIG. 1C is a schematic depiction of another example embodiment of the FIG. 1A autoscrubber and steering system.
Figure 10:
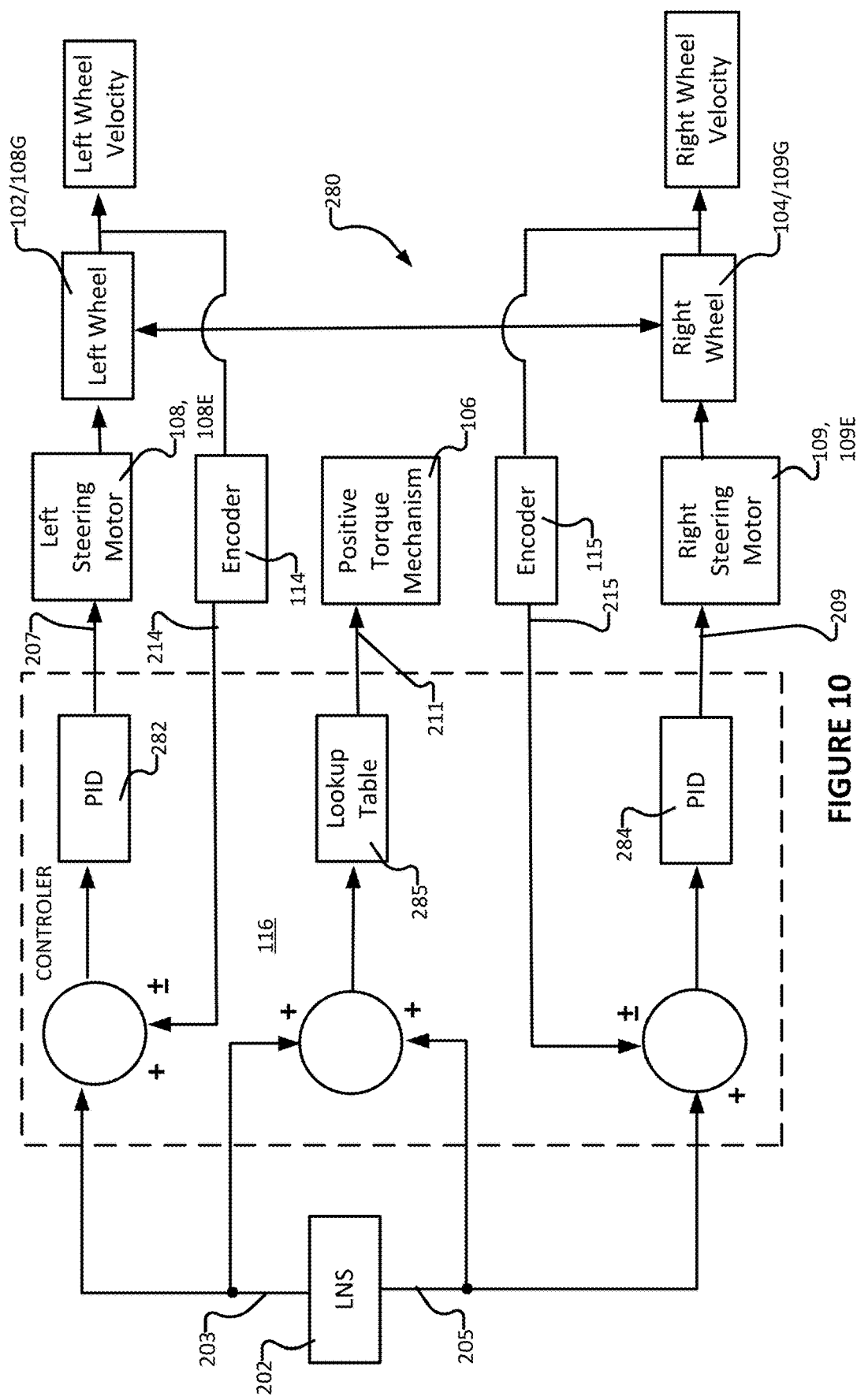

FIG. 10 is block diagram representation of a feedback control system/algorithm suitable for controlling the FIG. 1C steering system of the FIG. 1 autoscrubber in autonomous mode according to a particular embodiment.

Figure 11:
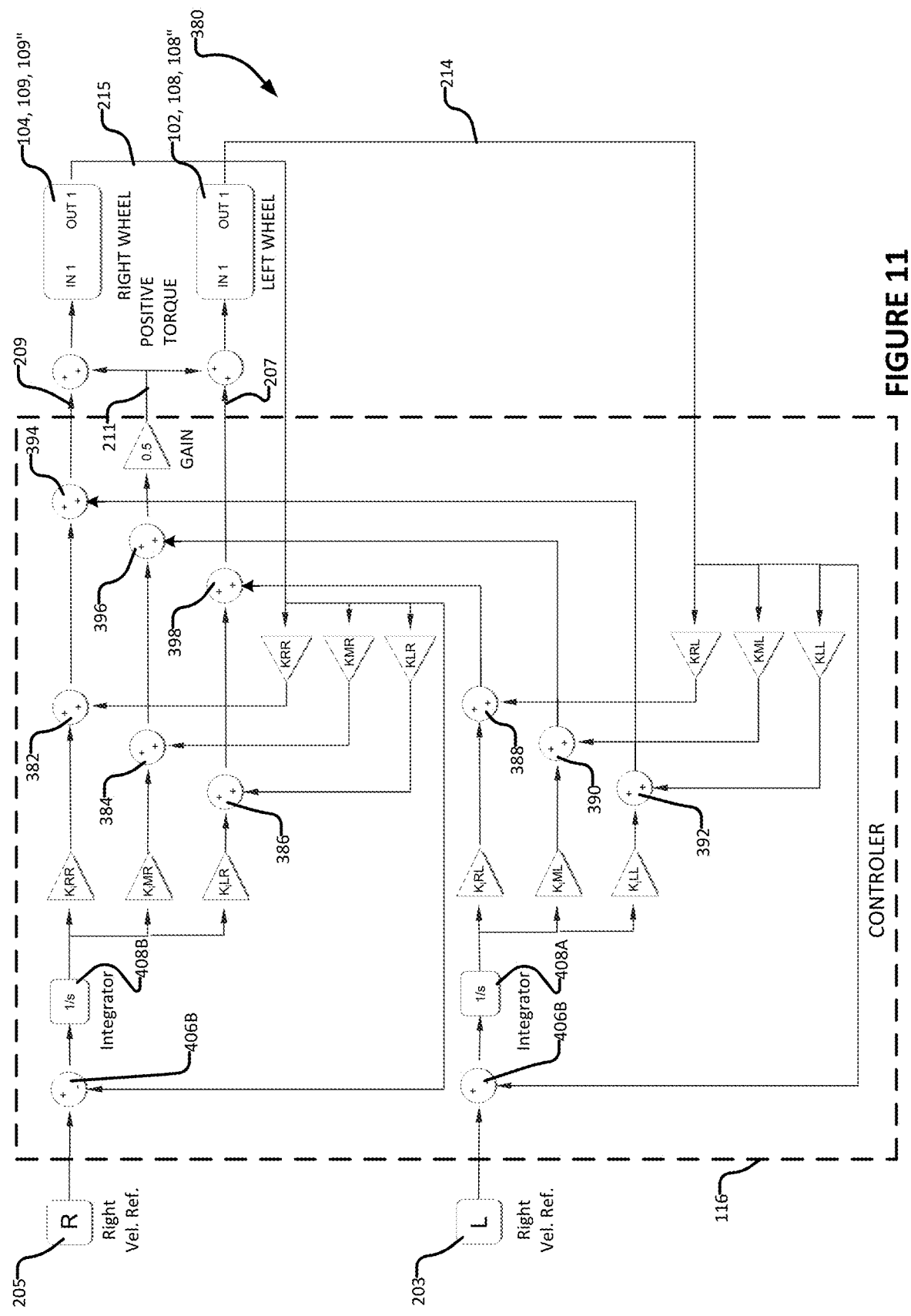

FIG. 11 is a block diagram representation of a MIMO control system/algorithm suitable for controlling the FIG. 1C steering system of the FIG. 1 autoscrubber in autonomous mode according to another particular embodiment.

Figure 12:
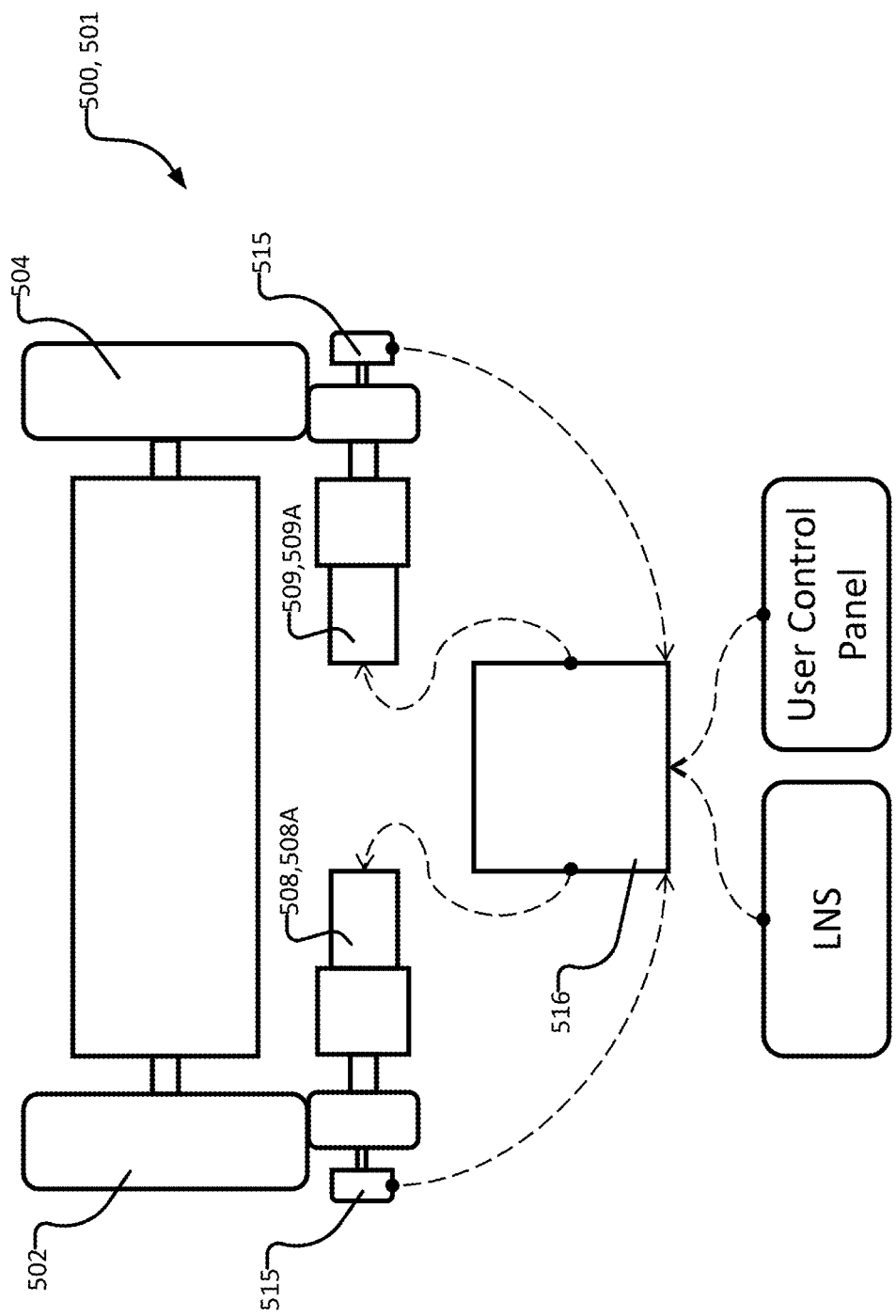

FIG. 12 is a block diagram representation of an autoscrubber having a combined steering and drive system comprising two independently controllable drive and steering torque mechanisms.

DESCRIPTION

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

Aspects of the invention provide autoscrubbers capable of being operated in a manual (e.g. walk-behind) mode and an autonomous (operator free) mode, switching between such operational modes, methods for implementing same and apparatus and methods for retrofitting existing walk-behind autoscrubbers to implement this functionality. In particular embodiments and/or aspects of the invention, the autonomous control capability does not detract appreciably from an operator's ability to use the autoscrubber in a manual (walk-behind) mode.

Advantageously, some embodiments and/or aspects of the invention provide a teach and repeat mode for autonomous control. Particular embodiments and/or aspects of the invention comprise steering systems which use a single positive torque mechanism to split positive driving torque between left and right drive wheels, while using individually controllable steering torque mechanisms for each of the left and right drive wheels. In particular embodiments and/or aspects of the invention, the controllable steering torque mechanisms comprise negative torque mechanisms, each of which provides negative torque to (or imparts negative torque on) its respective drive wheel and steers the autoscrubber through the application of negative torque differently to the different drive wheels. In particular embodiments and/or aspects of the invention, the controllable steering torque mechanisms may provide both positive and negative torque to their respective drive wheels. In such embodiments, steering may be implemented by application of different steering torque (positive and/or negative) to the different drive wheels. Particular embodiments and/or aspects of the invention provide a control mode which simulates a freewheel effect. In particular embodiments and/or aspects of the invention, the steering torque mechanisms capture energy via regenerative braking when operating in a negative toque mode.

Figure 7:
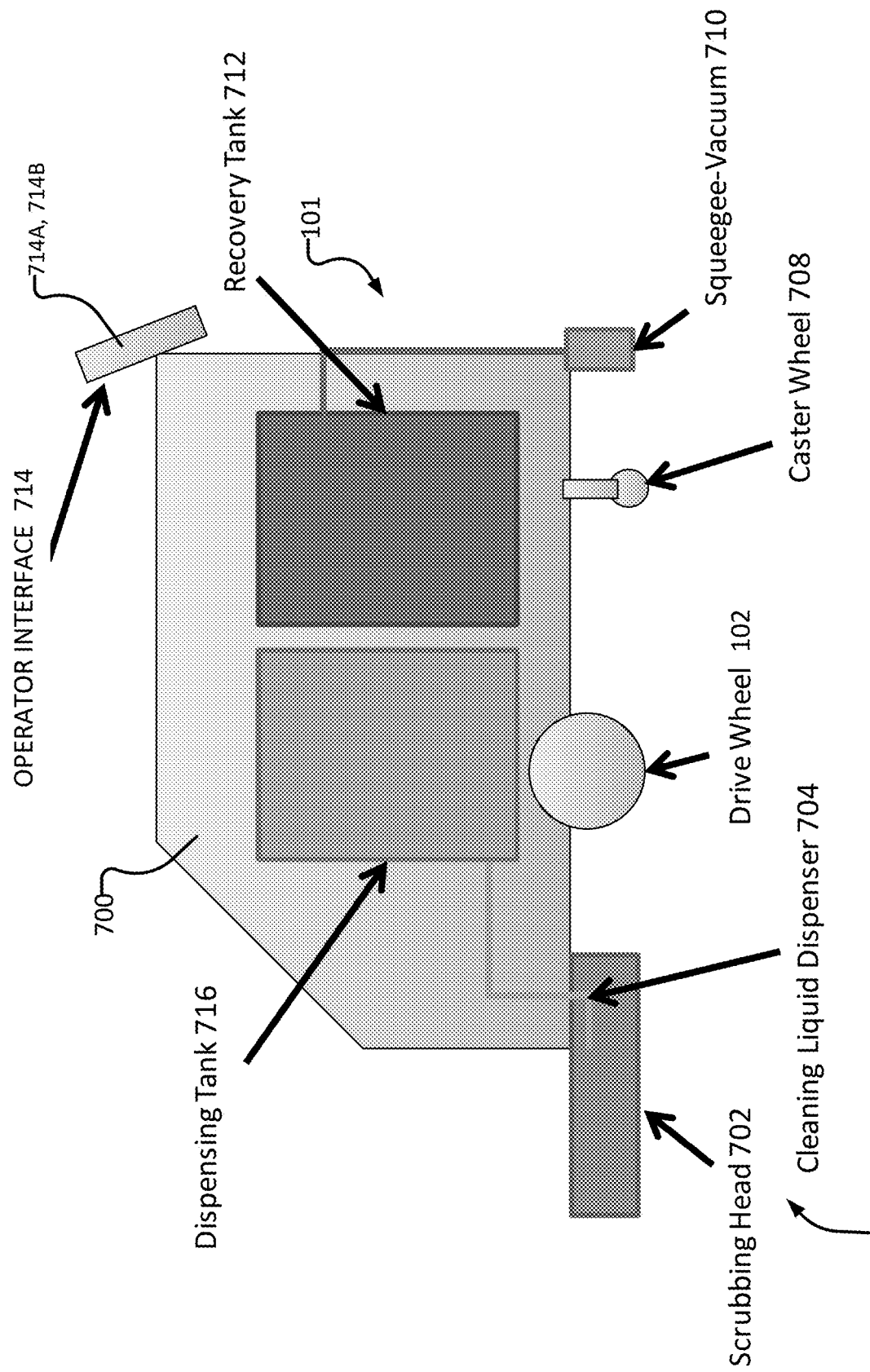
FIG. 7 is a schematic illustration of an autoscrubber according to a particular embodiment, which may comprise a walk-behind autoscrubber retrofitted to provide both a manual (e.g. walk-behind) operational mode and autonomous (operator free) operation mode or a new construction autoscrubber capable of operating in manual (e.g. walk-behind) operational mode and autonomous (operator free)

FIG. 7 is a schematic illustration of an autoscrubber 101 according to a particular embodiment. As explained in more detail below, autoscrubber 101 may comprise a walk-behind autoscrubber retrofitted to provide both a manual (e.g. walk-behind) operational mode and an autonomous (operator free) operational mode. Additionally or alternatively, autoscrubber 101 may comprise a new construction autoscrubber capable of operating in manual (e.g. walk-behind) operational mode and autonomous (operator free) operational mode. Autoscrubber 101 comprises a chassis 700 which supports a cleaning system 701 used for cleaning floors and the like. In the particular case of the illustrated embodiment, cleaning system 701 comprises a cleaning liquid dispensing tank 716, a cleaning liquid dispenser 704, a scrubbing head 702, a waste recovery system (typically a squeegee and/or a vacuum) 710 and waste recovery tank 712. In operation (i.e. when cleaning), cleaning liquid dispensing tank 716 feeds cleaning liquid (typically water mixed with cleaning solution(s)) to scrubbing head 702 via cleaning liquid dispenser 704. Scrubbing head 702 of the illustrated FIG. 7 embodiment comprises one or more (typically one or two) rotating or otherwise moveable brushes, which may have various shapes. The brush(es) of scrubbing head 702 may be moved by one or more suitable drive systems comprising suitable motors. In some embodiments, the brush(es) of the scrubbing head 702 are rotated (or otherwise moved) by an electric motor, either by direct coupling of the motor to the brush or with some form of speed reduction such as a gear box, pulley system and/or the like. In some embodiments, the speed of movement of the brush(es) of scrubbing head 702 is adjustable. The movement of the brush(es) of scrubbing head 702 together with the cleaning solution dispensed into scrubbing head 702 by cleaning liquid dispenser 704 cause the floors under autoscrubber 101 to be cleaned. Waste recovery system 710 (which in the illustrated FIG. 7 embodiment comprises a squeegee and a vacuum) picks up the used cleaning liquid and dirt contained therein and stores same in waste recovery tank 712. In some embodiments, the used cleaning liquid and dirt is passed through a filter and the filtered liquid is recycled back into the cleaning liquid dispensing tank 716.

Autoscrubber 101 of the illustrated FIG. 7 embodiment comprises a pair of drive wheels 102, 104 (only one of which is shown in FIG. 7) mounted to chassis 700. As explained in more detail below, the torque applied to drive wheels 102, 104 may be used to move autoscrubber 101 in both manual and autonomous operational modes and may be used to steer autoscrubber 101 in autonomous operational mode. Autoscrubber 101 of the illustrated FIG. 7 embodiment also comprises one or more castor wheels 708 or other suitable form of idler (non-driven) wheels 708 mounted to chassis 700. Autoscrubber 101 of the illustrated FIG. 7 embodiment comprises an operator interface 714, which in the illustrated embodiment comprises a handle 714A and a control panel 714B. Handle 714A may be gripped in the hand(s) of an operator for manual (e.g. walk-behind) operational mode. An operator may use handle 714A to steer autoscrubber 101 when operating in manual mode. A control panel 714B may be used by an operator to adjust machine settings pertaining to cleaning functionality, such as but not limited to brush rotation speed, cleaning liquid dispensing rate and/or the like. As described in more detail below, control panel 714B may also be used to switch between autonomous and manual operating modes, initiate teach and/or repeat phases, save and load path data, adjust operating speed, initiate and display system diagnostics, and configure and display various other machine settings. In some embodiments, control panel 714B is fixed onto autoscrubber 101. In some embodiments, control panel 714B is physically detached from the autoscrubber 101 and communicates with controller 116 of autoscrubber 101 (e.g. through wired and/or wireless (e.g. Wi-Fi, Bluetooth, radio communications, and/or the like)). In some embodiments, control panel 714B has a physical form factor. In some embodiments, control panel 714B is a software application deployable onto conventional computers or mobile computing devices through the means of an app, program, web portal and/or the like. While being described as a panel for brevity, control panel 714B need not be implemented as a panel and may generally comprise any user interface comprising machine input and/or machine output functionality and capable of operating in the manner described herein.

Autoscrubber 101 shown in FIG. 7 and described above represents one particular type of autoscrubber which may be fabricated or retrofitted to incorporate various embodiments of the invention. Autoscrubbers incorporating various aspects of the invention need not comprise all or any of the specific features of the FIG. 7 autoscrubber 101. It will be appreciated from the description that follows that various embodiments of the invention could be incorporated into a variety of different autoscrubbers, some of which may be different in some respects than autoscrubber 101 shown and described in FIG. 7. Example autoscrubbers may include ride-on and chariot style autoscrubbers.

FIG. 1A depicts a schematic view of a steering system 100 for an autoscrubber 101 according to a particular embodiment. Autoscrubber 101 and its steering system 100 are convertible between a manually controlled operational mode and an autonomous operational mode. In some embodiments, steering system 100, which may be supported on the chassis 700 of autoscrubber 101, may be retrofitted onto a conventional walk-behind autoscrubber to permit the walk-behind autoscrubber to operate in a manually controlled operational mode and an autonomous operational mode.

Steering system 100 of the FIG. 1 embodiment steers autoscrubber 101 by independently controlling drive wheel speed for left drive wheel 102 and right drive wheel 104. It will be appreciated that, when drive wheels 102, 104 rotate at different speeds, autoscrubber 101 will turn. Steering system 100 of the illustrated embodiment uses a single positive torque mechanism 106 for providing positive torque to each of drive wheels 102, 104. This positive torque applied to drive wheels 102, 104 propels autoscrubber 101 in a forward direction. Steering system 100 of the illustrated embodiment also comprises a pair of independently controllable steering torque mechanisms 108, 109. Steering torque mechanisms 108, 109 are independently controllable to apply positive torque (i.e. torque in a rotational direction consistent with the torque applied by positive torque mechanism 106) to their respective drive wheels 102, 104 and/or negative torque (i.e. braking, deceleration and/or some other torque in a rotational direction opposing the direction of torque applied by positive torque mechanism 106 and, in some cases, in a rotational direction opposing any rotation of drive wheels 102, 104) to their respective drive wheels 102, 104. Steering torque mechanisms 108, 109 should be understood to include any independently controllable mechanisms for applying torque to drive wheels 102, 104, which may result in drive wheels 102 and 104 having two different rotational velocities and/or cumulative output torque. The independently controllable nature of steering torque mechanisms 108, 109 allows for independent control of rotational speeds and/or output torque of drive wheels 102, 104. Steering of autoscrubber 101 may then be implemented by causing drive wheels 102, 104 to rotate at different speeds.

FIG. 1B schematically illustrates an example steering system 100B which represents a particular embodiment of the FIG. 1A steering system 100. In the FIG. 1B steering system 100B, steering torque mechanisms 108, 109 are embodied by negative torque mechanisms 108', 109' which specifically apply negative torque (e.g. braking or deceleration) to their respective drive wheels 102, 104 to achieve independent control of the rotational speeds and/or output torques of drive wheels 102, 104. FIG. 1C schematically illustrates another example steering system 100C which represents another particular embodiment of the FIG. 1A steering system 100. The FIG. 1C steering system 100C differs from the FIG. 1B steering system 100B in that, in the FIG. 1C steering system 100C, steering torque mechanisms 108, 109 are implemented by steering torque mechanisms 108", 109" (described in more detail below) which are capable of applying negative torque and/or positive torque to their respective drive wheels 102, 104 to achieve independent control of the rotational speeds and/or output torques of drive wheels 102, 104. Positive torque applied to drive wheels 102, 104 by steering torque mechanisms 108", 109" may be additional to the positive torque applied by positive torque mechanism 106.

During autonomous operational mode, torque mechanisms 106, 108, 109 are controlled by controller 116. Controller 116 is configured (e.g. using suitable hardware and/or software) to provide: suitable positive torque control signals 211 to positive torque driver circuit 110 which in turn provides suitable positive torque drive signals to positive torque mechanism 106; and suitable steering torque control signals 207, 209 to steering torque driver circuits 112, 113 which in turn provide suitable steering (e.g. positive steering or negative steering) torque drive signals to steering torque mechanisms 108, 109. Controller 116 may receive input signals 214, 215 from rotation sensors 114, 115 (e.g. rotary encoders, tachometers or other suitable sensors) which may respectively measure or otherwise be indicative of rotational characteristics of drive wheels 102, 104, from location and navigation system (LNS) 202, from user interface 714B and/or from other inputs (not shown). In some embodiments, LNS 202 may be implemented in whole or in part by controller 116. As discussed in more detail below, controller 116 may use these inputs to determine suitable positive torque control signals and steering control signals for controlling positive torque mechanism 106 and steering torque mechanisms 108, 109. Some embodiments of steering torque mechanisms 108, 109 (e.g. where steering torque mechanisms 108, 109 comprise electric motors, as is the case in steering system 100C of the FIG. 1C embodiment) may allow for recapture of energy when torques applied by steering torque mechanisms 108, 109 are in opposition to the current velocity/momentum of autoscrubber 101. In this case, controller 116 may be connected to redistribute this power back to an energy storage device and/or power source (not shown), such as a battery, another type of charge storage device and/or the like.

Controller 116 may generally comprise any combination of hardware and software capable of providing the functionality described herein. For example, controller 116 may be implemented in whole or in part on a programmed computer system comprising one or more processors, user input apparatus, displays and/or the like. Controller 116 may be implemented in whole or in part as an embedded system comprising one or more processors, user input apparatus, displays and/or the like. Processors may comprise microprocessors, digital signal processors, graphics processors, field programmable gate arrays, and/or the like. Components of controller 116 may be combined or subdivided, and components of controller 116 may comprise sub-components shared with other components of controller 116. Components of controller 116, may be physically remote from one another. Controller 116 may be connected (e.g. with suitable electrical connections (not expressly shown in FIG. 1)) to deliver control signals 211, 207, 209 to drive circuits 110, 112, 113. Controller 116 may be configured (e.g. using suitable software, logic configuration and/or the like) to use those control signals 211, 207, 209 to control the drive currents driven by drive circuits 110, 112, 113 into positive torque mechanism 106 and steering torque mechanisms 108, 109 to thereby control the torque applied to wheels 102, 104.

In the particular case of the illustrated embodiment of FIG. 1, positive torque mechanism 106 may comprise a transaxle 106A which is mechanically connected between drive motor 106B and wheels 102, 104 to split positive torque from motor 106B to drive wheels 102, 104. Transaxle 106A advantageously permits drive wheels 102, 104 to rotate at different speeds while still splitting torque from drive motor 106B (e.g. equally or at least approximately equally) between wheels 102, 104. In some embodiments, however, positive torque mechanism 106 may comprise other suitable mechanisms for mechanically connecting one or more drive motors to drive wheels 102, 104. By way of non-limiting example, some positive torque mechanisms 106 may comprise rotary electric motors (such as DC brushed motors, DC brushless motors, AC inductor motors, AC synchronous motors, electric linear induction motors and/or the like); heat engines (such as two-stroke combustion engines, four-stroke combustion engines, rotary engines and/or the like); compressed gas or pneumatic powered systems; spring wound systems and/or the like.

In the particular case of steering system 100B in the illustrated embodiment of FIG. 1B, steering torque mechanism 108 may comprise a brake mechanism 108A which may apply force to drive wheel 102 in a manner which generates torque in direction opposed to the torque applied by positive torque mechanism 106 or reduces the net torque applied to drive wheel 102 in the direction applied by positive torque mechanism 106. In the illustrated embodiments, brake mechanism 108A comprises a V-brake mechanism 108A or similar caliper mechanism which applies a squeezing force to drive wheel 102 at a particular radius. This squeezing force acts in a direction that is approximately parallel to the axis about which drive wheel 102 rotates. A friction force that is positively correlated with the squeezing force, generated by contact of the brake mechanism 108A onto drive wheel 102, generates a negative torque on the drive wheel 102 (in this case, a torque that opposes any direction of angular movement of drive wheel 102 about its axis). In some embodiments, rather than applying a squeezing force in a direction that is approximately parallel to the axis of rotation of drive wheel 102, other forces may be applied to drive wheel 102 to create negative torque. For example, a force may be applied in a direction normal (or approximately normal) to the surface of drive wheel 102. As another example, in some embodiments, a force may be applied in a direction that is a combination of parallel to the axis of rotation and normal to the surface of the wheel. In some embodiments, rather than applying force directly to drive wheel 102 itself, brake mechanism 108A may be configured apply force to a disc (not shown), or to some other intermediate member, which is rigidly or otherwise connected to rotate with, or otherwise move with the rotation of, drive wheel 102.

In the particular case of steering system 100B in the illustrated embodiment of FIG. 1B, brake 108A of steering torque mechanism 108 comprises an actuation mechanism which may comprise a motor (e.g. a stepper motor) 108D operatively connected to a winch take-up 108C which reels cable 108B connected to brake 108A. Rotation of motor 108D in a first angular direction causes cable 108B to be wound onto winch take-up 108C, thereby increasing the negative (braking) torque applied by steering torque mechanism 108 to drive wheel 102; and rotation of motor 108D in a second (opposite) angular direction causes cable 108B to be released from winch take-up 108C, thereby decreasing the negative (braking) torque applied by steering torque mechanism 108 to drive wheel 102. Advantageously, stepper motor 108D may provide a high resolution to the negative (braking) torque applied by steering torque mechanism 108 to drive wheel 102.

In some embodiments, negative torque mechanism 108 may comprise other suitable mechanisms for mechanically applying negative (braking) torque to drive wheel 102 (or to some suitable intermediate member). By way of non-limiting example, such steering torque mechanisms 108 may comprise: different forms of brake mechanisms (e.g. disc brakes in the place of V-brakes 108A); different forms of actuator (e.g. hydraulic actuation in the place of cables 108B and winch 108C; linear actuators in the place of stepper motor 108D; or the like); electric eddy current brakes; electric regenerative brakes; mechanical regenerative brakes (e.g. comprising flywheels, springs, gravity masses or the like); viscous dampers (e.g. fans, linear dampers or the like); and/or the like.

Steering torque mechanism 109 may comprise components similar to those of steering torque mechanism 108 which may be suitably modified for application of positive or negative torque to drive wheel 104 or to a disc (not shown), or to some other intermediate member, which is rigidly or otherwise connected to rotate with, or otherwise move with the rotation of, drive wheel 104.

FIG. 1C depicts a steering system 100C according to another example embodiment. In the particular case of steering system 100C depicted in the illustrated embodiment of FIG. 1C, steering torque mechanisms 108, 109 each comprise a DC steering motor 108E, 109E outfitted with a runner wheel 108G, 109G and a suitable speed-adjusting transmission or gearbox 108F, 109F. Runner wheels 108G, 109G turn in unison with (or at least with minimal slippage relative to) drive wheels 102, 104 of autoscrubber 101. The two sets of wheels (runner wheels 108G, 109G and drive wheels 102, 104) may be mechanically linked (runner wheel 108G to drive wheel 102 and runner wheel 109G to drive wheel 104) via friction between the wheel surfaces and suitably located and/or shaped mounts (e.g. to chassis 700). This connection between runner wheels 108G, 109G and drive wheels 102, 104 could additionally or alternatively be accomplished by means of gears, chains, belts, shaft coupling, or any other suitable mechanical linkage, which may or may not change the relative rotational speeds of runner wheels 108G, 109G and drive wheels 102, 104. Torque can be transferred in either direction (i.e. from drive wheels 102, 104 through runner wheels 108G, 109G and transmissions 108F, 109F to steering motors 108E, 109E, and/or from steering motors 108E, 109E via transmissions 108F, 109F and runner wheels 108G, 109G to drive wheels 102, 104).

In steering system 100C of the illustrated FIG. 1C embodiment, rotation sensors 114, 115 respectively provide sensor signals 214, 215 which comprise measurements or are otherwise indicative of the rotational characteristics (e.g. relative angular position, angular velocity and/or the like) of runner wheels 108G, 109G, and send this information to controller 116. It will be appreciated that where there is no slippage (or limited slippage) between runner wheels 108G, 109G and their respective drive wheels 102, 104, the rotational characteristics of runner wheels 108G, 109G may be converted by system controller 116 into rotational characteristics of drive wheels 102, 104. Accordingly, rotation sensors 114, 115 may be considered to provide feedback signals 214, 215 indicative of the rotational characteristics of both runner wheels 108G, 109G and drive wheels 102, 104. Such rotational characteristics of runner wheels 108G, 109G and/or drive wheels 102, 104 could also be gathered at the steering motors 108E, 109E, or drive wheels 102, 104.

In the illustrated embodiment, controller 116 receives (as inputs) feedback signals 214, 215 from rotation sensors 114, 115 which are measurements or otherwise indicative of the rotational characteristics (e.g. relative angular position, angular velocity and/or the like) of wheels 102, 104 (and/or, in some embodiments, runner wheels 108G, 109G). As will be appreciated by those skilled in the art, suitable signal conditioning circuitry (e.g. amplifiers, buffers, filters, analog to digital converters and/or the like—not expressly shown) may be provided between rotation sensors 114, 115 and controller 116. In the illustrated embodiment, controller 116 also receives (as inputs) left wheel and right wheel velocity reference signals 203, 205 from LNS 202 (see FIG. 1A) and/or from user interface 714B (FIG. 7). As discussed above, in some embodiments, LNS 202 may be implemented in whole or in part by controller 116, in which case controller 116 may not receive left wheel and right wheel velocity reference signals 203, 205 as inputs, but may instead generate left wheel and right wheel velocity reference signals 203, 205 as internal variables or signals. A control objective of controller 116 may be to cause drive wheels 102, 104 to track velocity reference signals 203, 205.

In the illustrated embodiment, as discussed above, controller 116 generates, as output signals: a positive torque control signal 211 which is provided to positive torque driver circuit 110; a left wheel steering torque control signal 207 which is provided to left wheel steering torque driver circuit 112; and a right wheel steering torque control signal 209 which is provided to right wheel steering torque driver circuit 113. Controller 116 may use its inputs (e.g. the feedback signals 214, 215 from rotation sensors 114, 115 and left wheel and right wheel velocity reference signals 203, 205) as a basis for determining its outputs (e.g. the positive torque control signal 211 and the left and right wheel steering torque control signals 207, 209) and may thereby execute desired behaviors. In particular, controller 116 may implement suitable feedback-based (closed loop) control technique or a combination of closed loop and open loop control techniques to cause the velocities of left and right wheels 102, 104 to track left wheel and right wheel velocity reference signals 203, 205. It will be appreciated that causing left and right wheels 102, 104 to rotate with different velocities will cause autoscrubber 101 to change its orientation (e.g. to steer). The specific nature of the behaviors implemented by controller 116 may depend on whether autoscrubber 101 is operating in autonomous operation mode or manual operational mode, as explained in more detail below.

In the illustrated embodiment, steering torque driver circuits 112, 113 and positive torque driver circuit 110 may comprise suitable electronic drive components for supplying suitable torque drive signals to steering torque mechanisms 108, 109 and positive torque mechanism 106 based on the corresponding torque control signals 211, 207, 209 received from controller 116. Such torque drive signals 211, 207, 209 may comprise electronic signals with suitable voltages, currents, duty cycles, power and/or other electronic characteristics suitable for controlling their respective steering torque mechanisms 108, 109 and positive torque mechanism 106. Such electronic driver circuits 110, 112, 113 may comprise pulse-width modulation (PWM) based driver circuits or any of a wide variety of other types of driver circuits which are well known in the art and are not described further herein.

Autoscrubber 101 may have two operational modes: autonomous operational mode and manual (walk-behind) operational mode. In some embodiments, steering system 100 of autoscrubber 101 is retrofitted onto an existing walk-behind manual controlled autoscrubber to provide dual mode autoscrubber 101. An operator can switch autoscrubber 101 from manual operational mode to autonomous operational mode (and vice versa) using some suitable switch, button, slider and/or the like (e.g. at user interface 714B).

Figure 2A:
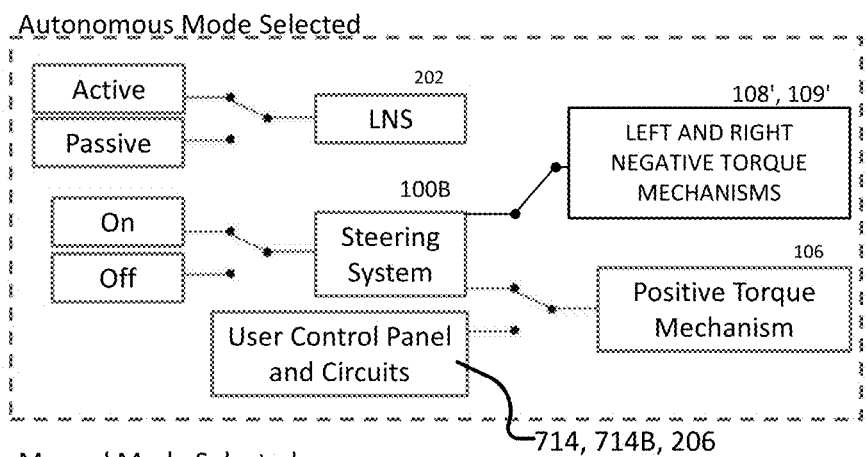
FIG. 2A is a schematic depiction of a number of components of the FIG. 1A autoscrubber with the FIG. 1B steering system in autonomous operational mode.
Figure 2B:
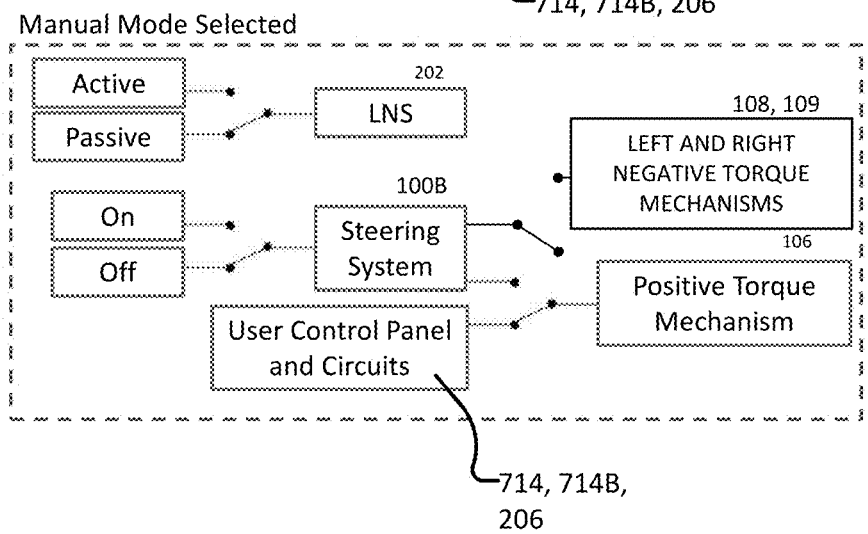
FIG. 2B is a schematic depiction of a number of components of the FIG. 1A autoscrubber with the FIG. 1B steering system in a manual operational mode.

FIG. 2A is a schematic depiction of a number of components of autoscrubber 101 implementing steering system 100B (FIG. 1B) in autonomous operational mode as described above. It can be seen from FIG. 2A, that when operating in autonomous operational mode, LNS 202 is active and steering system 100B controls negative torque mechanisms 108', 109' and positive torque mechanism 106. FIG. 2B is a schematic depiction of a number of components of autoscrubber 101 implementing steering system 100B (FIG. 1B) in a manual operational mode. It can be seen, from FIG. 2B and from contrasting FIG. 2B with FIG. 2A, that in manual (walk-behind) operational mode, LNS 202 is de-activated, there is no control of negative torque mechanisms 108', 109' and a user interface (e.g. control panel 714B of operator interface 714) and associated circuits 206 may be used to control positive torque mechanism 106. In some embodiments, negative torque mechanisms 108', 109' may be physically decoupled from wheels 102, 104 in manual operational mode. For example, in the case of steering system 100B of the illustrated embodiment of FIG. 1B, brake mechanism 108A can be physically decoupled from drive wheel 102 (and negative torque mechanism 109' can be similarly physically decoupled from drive wheel 104) to permit drive wheels 102, 104 to rotate without the influence of negative torque mechanisms 108', 109'. In some embodiments, autoscrubber 101 can be configured such that, in manual operational mode, a user may be able to control negative torque mechanisms 108', 109' using user control panel 714B and associated circuits 206.

Figure 2C:
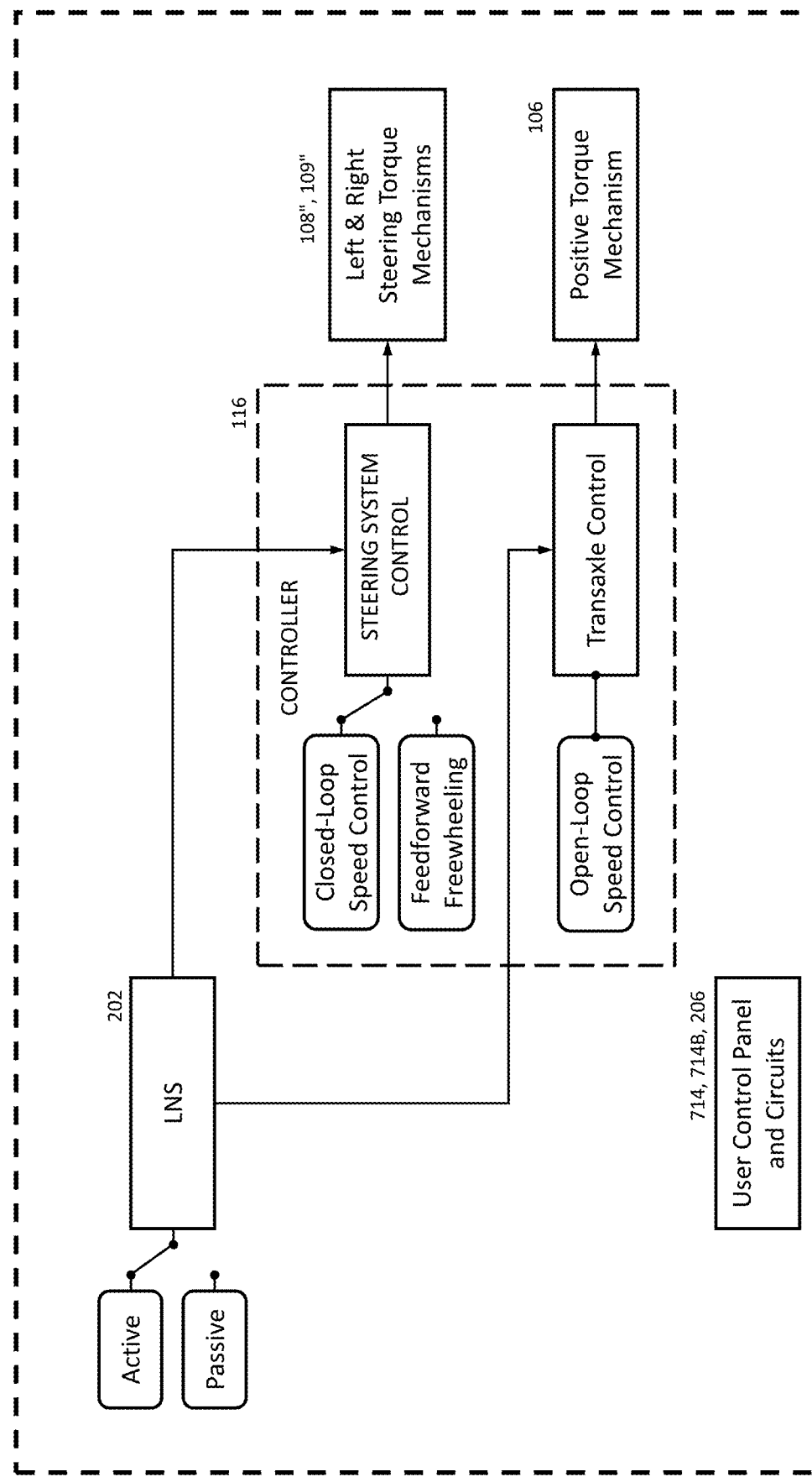
FIG. 2C is a schematic depiction of a number of components of the FIG. 1A autoscrubber with the FIG. 1C steering system in autonomous operational mode.

FIG. 2C is a schematic depiction of a number of components of autoscrubber 101 implementing steering system 100C (FIG. 1C) in autonomous operational mode as described above. It can be seen from FIG. 2C, that when operating in autonomous operational mode, LNS 202 is active and controller 116 controls steering torque mechanisms 108", 109" and positive torque mechanism 106. More specifically, in the particular case of the illustrated FIG. 2C embodiment, controller 116 is shown implementing closed loop speed control for steering torque mechanisms 108", 109" and controller 116 is shown implementing open loop speed control for positive torque mechanism 106. This is not necessary. In some embodiments, closed loop control can also be implemented for positive torque mechanism 106. Further control techniques are described in more detail below.

Figure 2D:
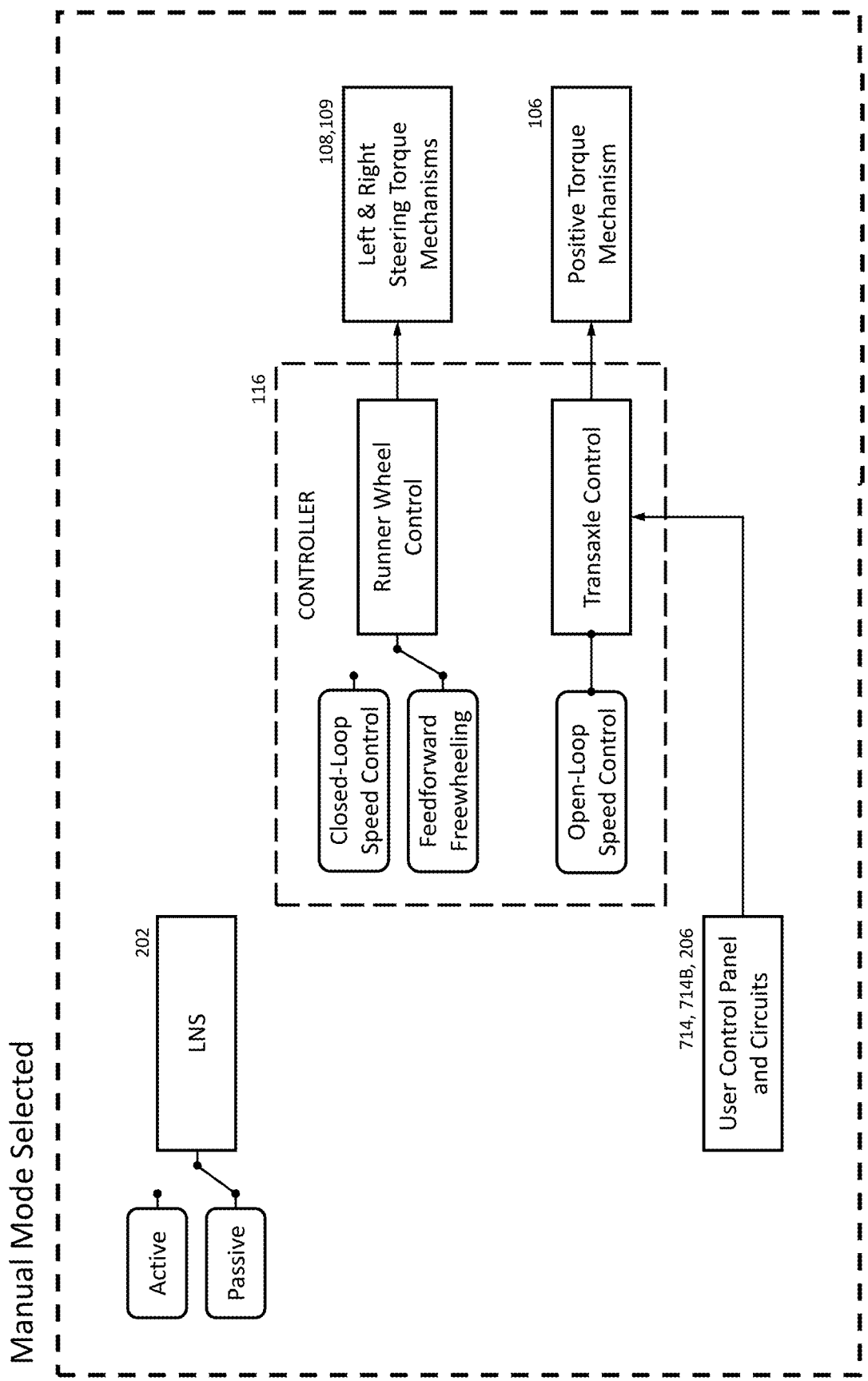
FIG. 2D is a schematic depiction of a number of components of the FIG. 1A autoscrubber with the FIG. 1C steering system in a manual operational mode.

FIG. 2D is a schematic depiction of a number of components of autoscrubber 101 implementing steering system 100C (FIG. 1C) in manual operational mode as described above. As is the case with FIG. 2B described above, LNS 202 is de-activated and a user interface (e.g. control panel 714B of operator interface 714) and associated circuits 206 may be used to control positive torque mechanism 106. However, unlike the case of FIG. 2B described above, in the particular case of steering system 100C of the FIG. 1C embodiment, runner wheels 108G. 109G are held in continuous contact with drive wheels 102, 104 and steering torque mechanisms 108", 109" are not physically decouplable from drive wheels 102, 104 in autonomous mode. Consequently, controller 116 may implement feedforward based "freewheeling" control.

An objective of freewheeling control is to supply suitable control signals 207, 209 to steering torque drive circuits 112, 113 such that drive circuits drive steering torque motors 108E, 109E in such a manner that a user autonomously operating autoscrubber 101 is not aware of or does not feel the resistance that might otherwise be applied to rotation of drive wheels by steering torque mechanisms 108", 109"—i.e. such that runner wheels 108G, 109G rotate as though they are "freewheeling" without corresponding mechanical linkages to steering torque motors 108E, 109E.

Figure 2E:
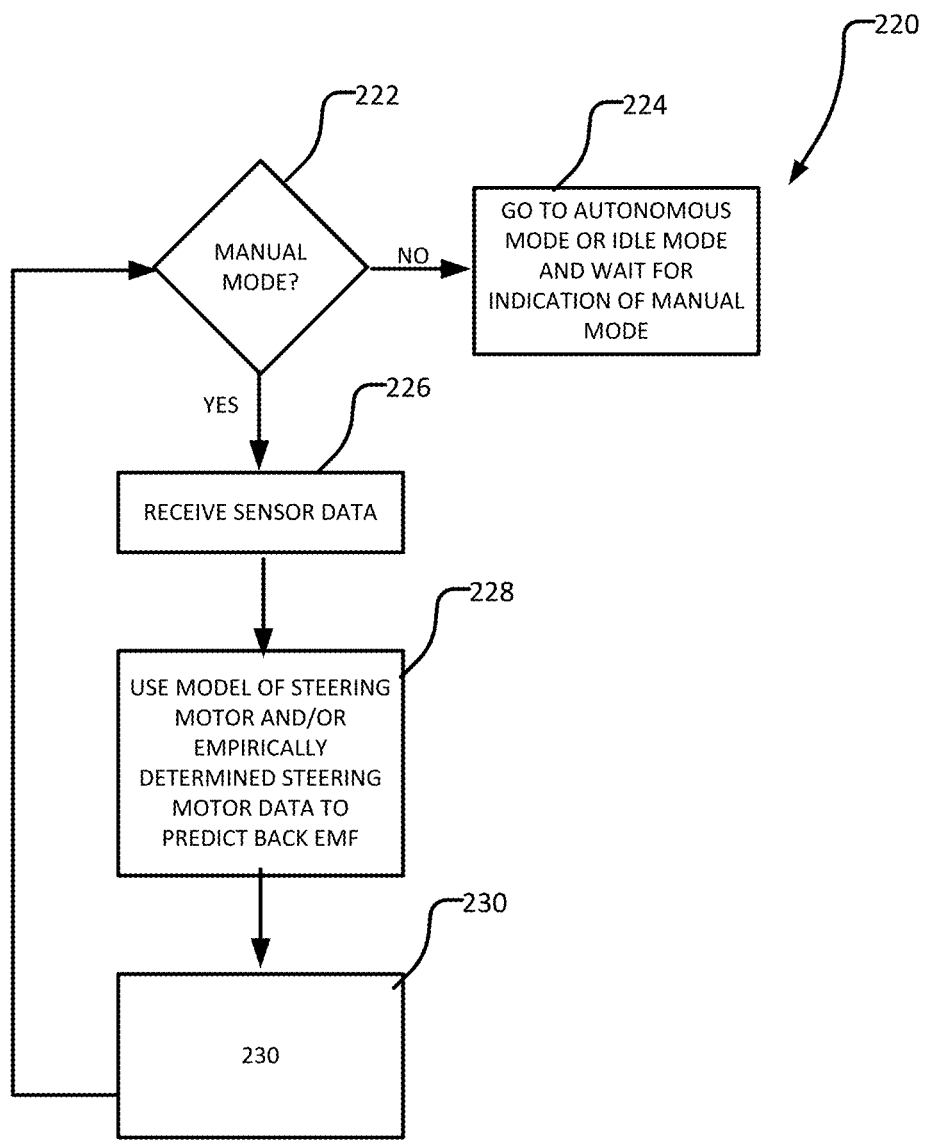
FIG. 2E is a schematic depiction of a method for implementing feedforward freewheeling control.

A schematic flow chart showing a method 220 for implementing feedforward freewheeling control is shown in FIG. 2E. The objective of the FIG. 2E method 220 is to establish zero (or acceptably close to zero) current in steering motors 108E, 109E. Method 220 starts in block 222 which involves an inquiry into whether autoscrubber 101 is in manual mode. If the block 222 inquiry is negative, then method 220 proceeds to block 224 which involves implementing autonomous operational mode or an idle mode, while waiting for manual mode to occur again If the block 222 inquiry is positive, then method 226 proceeds to block 226. Block 226 involves acquiring sensor data. In the particular case of the illustrated (FIG. 1C) embodiment, the sensor data acquired in block 226 may comprise rotational data indicative of the rotational characteristics of runner wheels 108G, 109G and similarly indicative of rotational characteristics of steering motors 108E, 109E. In other embodiments, additional or alternative sensors can be used in block 226 to measure or obtain other measurements indicative of the operational characteristics of steering motors 108E, 109E. By way of non-limiting example, such sensors could comprise current sensors connected to measure the current through steering motors 108E, 109E. Method 220 then proceeds to block 228 which involves using a model of steering motors 108E, 109E or empirically determined characteristics of steering motors 108E, 109E to predict a back EMF. It will be appreciated by those skilled in the art that when steering motors 108E, 109E rotate (because of runner wheels 108G, 109G attached to drive wheels 102, 104), steering motors 108E, 109E will generate a back EMF. With a suitable model (e.g. a no-load model) of steering motors 108E, 109E and/or with empirically determined operational characteristics (e.g. no load operational characteristics) associated steering motors 108E, 109E, controller 116 can use the block 226 sensor data to predict a corresponding back EMF. A mapping between the block 226 sensor data and the predicted back EMF may be maintained in a suitable look up table or the like which may be accessible to controller 116.

In one particular embodiments, the block 226 model can be obtained empirically by using PWM duty cycles with a range from 0%-100% and then recording the corresponding rotational speed of the motor under no load conditions. The model can be obtained for both positive and negative rotational directions. In some embodiments, these empirically determined data points can be maintained in a look up table accessible to controller 116. In some embodiments, these empirically determined data points can be fit to a suitable curve (e.g. a;linear curve) and then the curve's parameters can be used by controller 116 to make the block 228 predictions.

Once the back EMF is predicted in block 228, method 220 proceeds to block 230, which involves determining suitable steering control signals 207, 209 which will cause the desired back EMF (or an equivalent effective PWM signal) to be applied to steering motors 108E, 109E. Controller 116 may output these signals as control signals 207, 209 to steering torque drivers 112, 113. With these signals, steering torque drivers 112, 113, drive suitable drive signals to steering motors 108E, 109E which effectively cause the current in steering motors 108E, 109E to be zero or near zero. Accordingly, when a user operates autoscrubber 101 in manual mode, the user obtains the sensation that autoscrubber is operating like a conventional walk-behind autoscrubber because the autoscrubber is "freewheeling" independent of the resistance that would otherwise be caused by steering torque mechanisms 108", 109". As discussed above in connection with FIG. 2D, forward velocity/power may be requested by the user at user interface 714B and may be implemented in an open loop manner, and steering is provided by the user who applies lateral forces at handle(s) 714A. Application of lateral forces allows the user to easily steer autoscrubber 101 by increasing the velocity of one wheel 102, 104 and/or decreasing the velocity of the other wheel 104, 102. At the conclusion of block 230, method 220 loops back to block 222 for another iteration.

In other embodiments, steering torque mechanisms 108", 109" of the FIG. 1C steering system 100C could be made to be physically decouplable from drive wheels, so that freewheeling control is not required.

FIG. 10 is block diagram representation of a feedback control system/algorithm 280 suitable for controlling the FIG. 1C steering system 100C of the FIG. 1 autoscrubber 101 in autonomous mode according to a particular embodiment. The FIG. 10 control algorithm may be implemented by controller 116. Controller 116 uses velocity feedback signals 214, 215 from rotation sensors 114, 115 to implement PID velocity control loops for each of steering torque mechanisms 108, 109 (represented in FIG. 10 by their corresponding steering motors 108E, 109E and runner wheels 108G, 109G). As discussed above, rotation sensors 114, 115 may be operatively connected to left and right drive wheels 102, 104 and/or to left and right runner wheels 108G, 109G. In the FIG. 10 embodiments, the PID loops for the left and right runner wheels 108G, 109G (and/or the left and right drive wheels 102, 104) are independent and informationally isolated from one another, and executed via control signals 207, 209 sent to steering torque mechanisms 108, 109 (and more particularly to their driver circuits 112, 113—not shown in FIG. 10, but see FIG. 1C and discussion above). In the illustrated FIG. 10 embodiment, control signals 207, 209 are determined by PID blocks 282, 284 of controller 116. In the illustrated embodiment of FIG. 10, positive torque mechanism 106 is controlled in an open-loop manner, based on known motor performance characteristics (which may be stored in look up table 285) and velocity reference commands/signals 203, 205 issued by LNS 202. Velocity reference commands 203, 205 are issued from LNS 202 in the form of desired right and left wheel 102, 104 velocity setpoints, which controller 116 uses as input for each of the three control loops.

The type of dual isolated PID and single open-loop control scheme shown in FIG. 10 could also be implemented with different feedback information. Other implementations could be torque-based, relying on feedback information from current sensors in lieu of or in addition to rotation sensors 114, 115. A modified implementation of this control scheme is modified to use velocity feedback information 214, 215 from both drive wheels 102, 104 (or roller wheels 108G, 109G) to control positive drive torque mechanism 106 in a closed-loop manner based on such feedback, rather than in an open-loop manner. It will be appreciated that the FIG. 10 control system 280 could be used with the FIG. 1B steering system 100B by substituting negative torque mechanisms 108', 109' for steering motors 108E, 109E.

An additional or alternative control technique utilizes a MIMO (Multi Input Multi Output) control system/algorithm to control left and right wheel velocities (e.g. for drive wheels 102, 104 or roller wheels 108G, 109G). FIG. 11 is block diagram representation of a feedback control system/algorithm 380 suitable for controlling the FIG. 1C steering system 100C of the FIG. 1 autoscrubber 101 in autonomous mode using a MIMO approach according to a particular embodiment. The FIG. 11 control system/algorithm 380 may be implemented by controller 116. Controller 116 receives (as inputs) left and right wheel velocities, in the form of feedback signals 214, 215 provided by suitable rotational sensors 114, 115 (not expressly shown in FIG. 11, but see FIG. 1C) and also the left and right wheel velocity reference signals 203, 205 coming from LNS 202. Controller 116 outputs torque control signals 207, 209 for steering torque mechanisms 108,109 (see FIG. 1) and torque control signal 211 for positive torque mechanism 106. The FIG. 11 illustration also omits driver circuits 110, 112, 113 (shown in FIGS. 1B and 1C) to avoid obfuscating the control features.

Control system/algorithm 380 comprises two feedback loops—one for each of steering torque mechanisms 108, 109 and corresponding wheels 102, 104. First summing junctions 406A, 406B determine errors between the desired (reference) wheel velocities 203, 205 and the feedback velocities 214, 215. These errors are integrated by integrators 408A, 408B and the integrated results are scaled by integral gains. Control system/algorithm 380 comprises six integral gains (three gains for each steering torque mechanism 108, 109 and corresponding wheel 102, 104) as follows:

KiRR: Right steering mechanism torque based on right wheel speed error;
KiMR: Transaxle (Positive Torque Mechanism) based on right wheel speed error;
KiLR: Left steering mechanism torque based on right wheel speed error;
KiRL: Right steering mechanism torque based on left wheel speed error;
KiML: Transaxle (Positive Torque Mechanism) based on left wheel speed error; and
KiLL: Left steering mechanism torque based on left wheel speed error.

Control system/algorithm 380 also comprises six gains (referred to as proportional gains) which are applied directly to the feedback signals 214, 215 from rotational sensors 114, 115. The six proportional gains (three gains for each steering torque mechanism 108, 109 and corresponding wheel 102, 104) include:

KRR: Right steering mechanism torque based on right wheel speed (not speed error);
KMR: Transaxle torque based on right wheel speed;
KLR: Left steering mechanism torque based on right wheel speed;
KRL: Right steering mechanism torque based on left wheel speed;
KML: Transaxle torque based on left wheel speed; and
KLL: Left steering mechanism torque based on left wheel speed.

A purpose of the various gains is to determine how much torque is needed to achieve desired wheel speeds. In the FIG. 11 control system/algorithm 380, the outputs from the corresponding integral gains and the corresponding proportional gains are added to one another at summing junctions 382, 384, 386 (for the right wheel feedback 215) and at summing junctions 388, 390, 392 (for the left wheel feedback 214). For example, the output of integral gain KiRR is added to proportional gain KRR at summing junction 382, the output of integral gain KiRL is added to proportional gain KRL at summing junction 388 and so on. Then, the outputs from summing junctions 382 and 392 are summed together at summing junction 394 (for right steering torque mechanism 109), the outputs from summing junctions 384 and 390 are summed together at summing junction 396 (for the positive torque mechanism 106) and the outputs from summing junctions 386, 388 are summed together at summing junction 398 (for left steering torque mechanism 108) to result in corresponding control signals 209 (for right steering torque mechanism 109), control signal 211 (for positive torque mechanism 106) and 207 (for left steering torque mechanism 108).

The following mathematics illustrates the principles of the FIG. 11 control system/algorithm 380. The left and right wheels 102, 104 of the transaxle may be modelled using the following differential equations:

$$J_L \ddot{\theta}_L + B_L \dot{\theta}_L = \frac{T_M}{2} - T_L + T_R \quad (1a)$$

$$J_R \ddot{\theta}_R + B_R \dot{\theta}_R = \frac{T_M}{2} - T_R + T_L \quad (1b)$$

Where $J_L$ and $J_R$ are the rotational inertia of the left and right wheels and $B_L$ and $B_R$ are the viscous frictions of the left and right wheels. $T_M$, $T_L$, and $T_R$ are the transaxle (positive) torque, left steering torque, and right steering torque respectively. The system of equations (1a) and (1b) can be rearranged to have the following state space equation:

$$\begin{bmatrix} \ddot{\theta}_L \\ \ddot{\theta}_R \end{bmatrix} = \begin{bmatrix} -\frac{B_L}{J_L} & 0 \\ 0 & -\frac{B_R}{J_R} \end{bmatrix} \begin{bmatrix} \dot{\theta}_L \\ \dot{\theta}_R \end{bmatrix} + \begin{bmatrix} \frac{1}{J_L} & \frac{1}{J_L 2} & -\frac{1}{J_L} \\ -\frac{1}{J_R} & \frac{1}{J_R 2} & \frac{1}{J_R} \end{bmatrix} \begin{bmatrix} T_R \\ T_M \\ T_L \end{bmatrix} \quad (2)$$

To control the equation (2) state space system control system/algorithm 380 may use a state space pole placement controller with integrator. The command torques $T_M$, $T_L$, and $T_R$ may be provided as follows:

$$\begin{bmatrix} \ddot{\theta}_L \\ \ddot{\theta}_R \\ e_L \\ e_R \end{bmatrix} = \begin{bmatrix} -\frac{B_L}{J_L} + \frac{K_{RL} + \frac{K_{ML}}{2} - K_{LL}}{J_L} & \frac{K_{RR} + \frac{K_{MR}}{2} - K_{RL}}{J_L} & \frac{K_{iRL} + \frac{K_{iML}}{2} - K_{iLL}}{J_L} & \frac{K_{iRR} + \frac{K_{iMR}}{2} - K_{iLR}}{J_L} \\ \frac{-K_{RL} + K_{ML}/2 + K_{LL}}{J_R} & -\frac{B_R}{J_R} + \frac{-K_{RR} + K_{MR}/2 + K_{RL}}{J_R} & \frac{-K_{iRL} + K_{iML}/2 + K_{iLL}}{J_R} & \frac{-K_{iRR} + K_{iMR}/2 + K_{iLR}}{J_R} \\ -1 & 0 & 0 & 0 \\ 0 & -1 & 0 & 0 \end{bmatrix} \begin{bmatrix} \dot{\theta}_L \\ \dot{\theta}_R \\ \int e_L dt \\ \int e_R dt \end{bmatrix} + \begin{bmatrix} 0 & 0 \\ 0 & 0 \\ 1 & 0 \\ 0 & 1 \end{bmatrix} \begin{bmatrix} \omega_L \\ \omega_R \end{bmatrix} \quad (3)$$

where $\omega_L$ and $\omega_R$ are the commanded wheel velocities 203, 205.

It will be appreciated that the continuous time equations (1a), (1b), (2) and (3) may be discretized for the purposes of digital implementation by controller 116. It will be further appreciated that the FIG. 11 control system 380 could be used with the FIG. 1B steering system 100B by substituting negative torque mechanisms 108', 109' for steering torque mechanisms 108", 109" shown in FIG. 11.

The switching of the various systems between manual and autonomous operational modes may be effected by conventional switches, relays, software switches and/or the like. When LNS 202 is in passive mode (i.e. autoscrubber is in manual operational mode), LNS 202 does not provide left and right wheel velocity reference signals 203, 205 to controller 116. However, LNS system 202 may still be operational and may collect sensor data (as described in more detail below). When LNS 202 is in active mode, LNS 202 may provide left and right wheel velocity reference signals 203, 205 to controller 116, as described above. In manual operational mode, autoscrubber 101 may be operated in the same manner as conventional walk-behind autoscrubbing machines, where the user selects the forward speed with a knob, slider or other user input on user interface 714B and steers autoscrubber 101 by physically turning the machine.

In addition to manually operating autoscrubber 101 in the manner discussed above, some embodiments may provide the ability for remote operation and monitoring of autoscrubber 101. Remote operation and monitoring of autoscrubber 101 may be used to connect to autoscrubber 101 from a remote location for diagnostics, operation and/or the like. FIG. 8 shows a schematic representation of a remote monitoring system 250 which may be used to connect to autoscrubber 101 for diagnostics, operation and/or the like. A remotely located user may control various aspects of autoscrubber 101 using a PC user interface 252 or mobile user interface 254 which may be located remotely from autoscrubber 101. PC user interface 252 and/or mobile user interface 254 may connect to autoscrubber 101 via a cloud server 258 to which autoscrubber 101 may be wirelessly connected. The connection of PC user interface 252 and/or mobile user interface 254 to cloud server 258 may be via wireless access point 256 or may be wireless. User interfaces 252, 254 may permit the user to control different aspects of autoscrubber 101, such as, by way of non-limiting example, running pre-defined test procedures; running commands to access system logs and diagnostics features; moving autoscrubber 101 around while collecting sensor data to assess the environment; and/or the like. User interfaces 252, 254 may be used to visualize messages being passed in the network such as readings from vision sensor, navigation sensor, attitude sensor, odometry, proximity sensors, robot diagnostics, command signals to actuators and/or the like.

Cloud server 258 may manage traffic between autoscrubber and user interfaces 252, 254 and may be additionally or alternatively be used as intermediate processing node to minimize excessive network traffic using intelligent algorithms, such as data compression algorithms, environment simulation for training and collaborative control. Remote monitoring system 250 may optionally comprise a user-input device 260, such as a joystick or the like which may be useful when remotely operating autoscrubber 101.

The following represents an example use case for remote monitoring system 250 of FIG. 8. A remote operator may receive a feed from a vision sensor on PC user interface 252 (e.g. on a display device attached to a remote PC running suitable user interface software for interacting with autoscrubber 101). The vision sensor may be mounted on a pan-tilt gimbal on autoscrubber 101. The pan-tilt gimbal may connect to controller 116 of autoscrubber 101 via a microcomputer based serial interface. The user may then use user interface 252 to send suitable commands to autoscrubber 101 to operate the gimbal via a virtual private network hosted on cloud server 258. Additionally, the remote user may receive a feed from a vision sensor on autoscrubber 101 via a mobile application which implements mobile user interface 254 on a corresponding mobile computing device. The user may then communicate with autoscrubber 101 to provide suitable commands to operate the gimbal. The controls to operate the gimbal may be captured, for example, by sensing head movement captured using a suite of motion sensors in mobile user interface 254 or by suitable image interpretation software.

In some embodiments, other functions (such as, by way of non-limiting example, control of cleaning motors, vacuums, scrubber deployment, squeegee deployment, and liquid dispensers and/or the like) may also be accomplished via user interface 714B. The details of the control of such functionalities may be substantially similar to that of conventional walk-behind autoscrubbers and is not described in further detail here. In some embodiments, however, one or more of these functionalities may be controlled by controller 116 during autonomous and/or manual operational modes.

LNS 202 is a localization and navigation system 202 which, as its name implies, may locate autoscrubber 101 in an environment and may control the movement of (i.e. navigate) autoscrubber 101 when autoscrubber 101 is in an autonomous operational mode. LNS 202 may control the movement of autoscrubber 101 by providing suitable left and right wheel velocity signals 203, 205 which may be controllably tracked by steering system 100 and which may cause autoscrubber 101 to move and steer, as described above. In some embodiments, LNS 202 uses a "teach and repeat" approach whereby an operator "teaches" a path for autoscrubber 101 to follow (in manual operational mode) by manually guiding autoscrubber 101 along the desired path while indicating start and end locations and LNS 202 causes autoscrubber 101 to repeat the path (in autonomous operational mode) when the operator positions autoscrubber anywhere on (or near) the path and initiates the repeat program.

Figure 3:
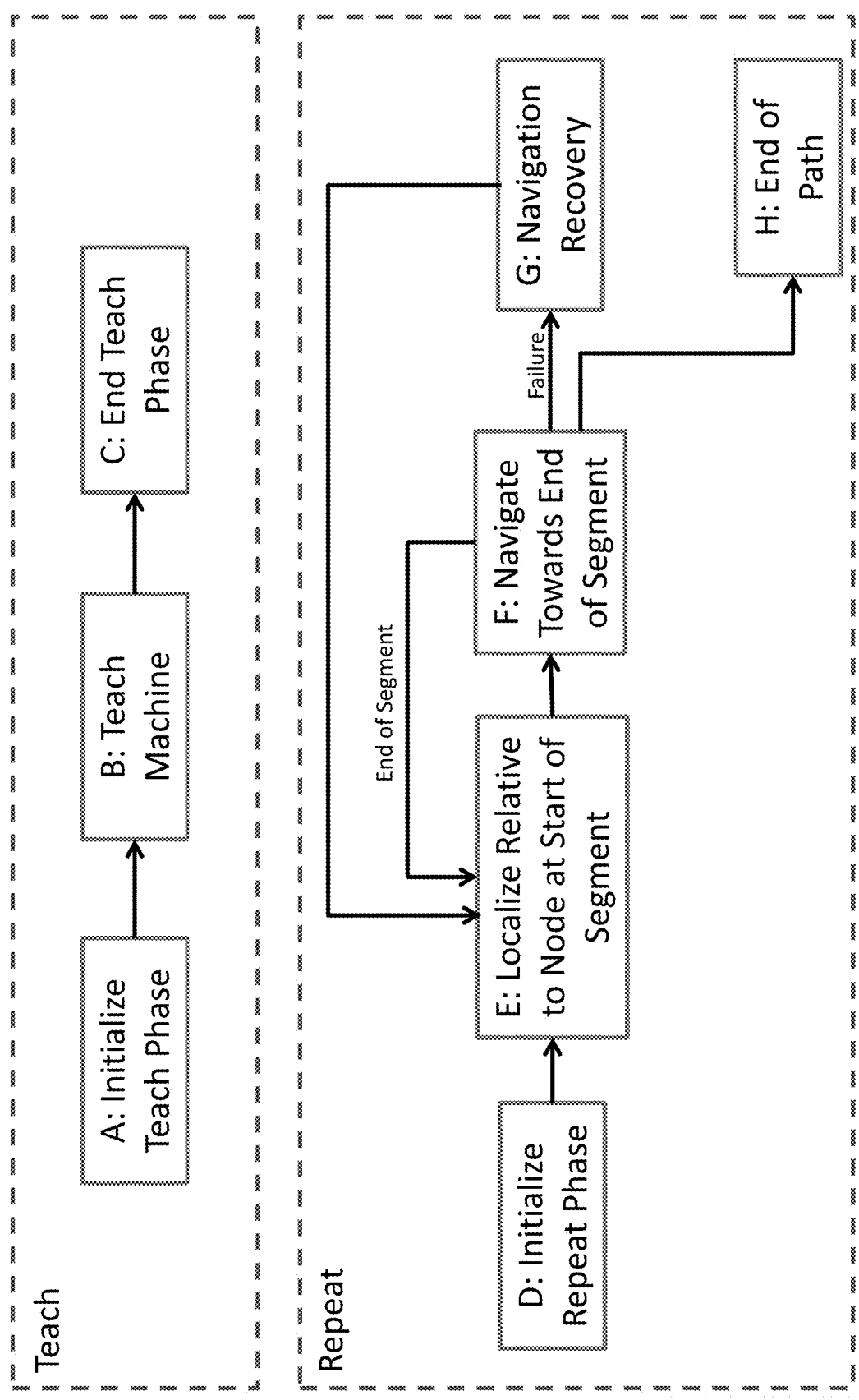
FIG. 3 is a state machine representation of a localization and navigation system (LNS) suitable for use with the FIG. 1 autoscrubber operating in teach and repeat modes according to a particular embodiment.

FIG. 3 is a state machine representation of LNS 202 according to a particular embodiment. In the illustrated embodiment, the states of LNS 202 are divided into teach mode (comprising states A, B and C) and repeat mode (comprising states D, E, F, G, H, and I). Generally speaking, in teach mode, an operator demonstrates a path for autoscrubber 101 to follow (in manual operational mode) by manually guiding autoscrubber 101 along the desired path while indicating start and end locations; and, in repeat mode, LNS 202 causes autoscrubber 101 to repeat the path (in autonomous operational mode) when the operator positions autoscrubber anywhere on (or near) the path and initiates the repeat program.

In state A, an operator positions autoscrubber 101 to a start of a path and engages teach mode. LNS then proceeds to state B, where the operator manually guides autoscrubber through a desired path using conventional manual walk-behind operation, as discussed above. During the movement of autoscrubber 101 along the desired path in state B, autoscrubber 101 records data from various sensors with the purpose of recording the particulars of the desired path in a manner that will facilitate autoscrubber 101 subsequently traversing the desired path autonomously in repeat mode.

Figure 5:
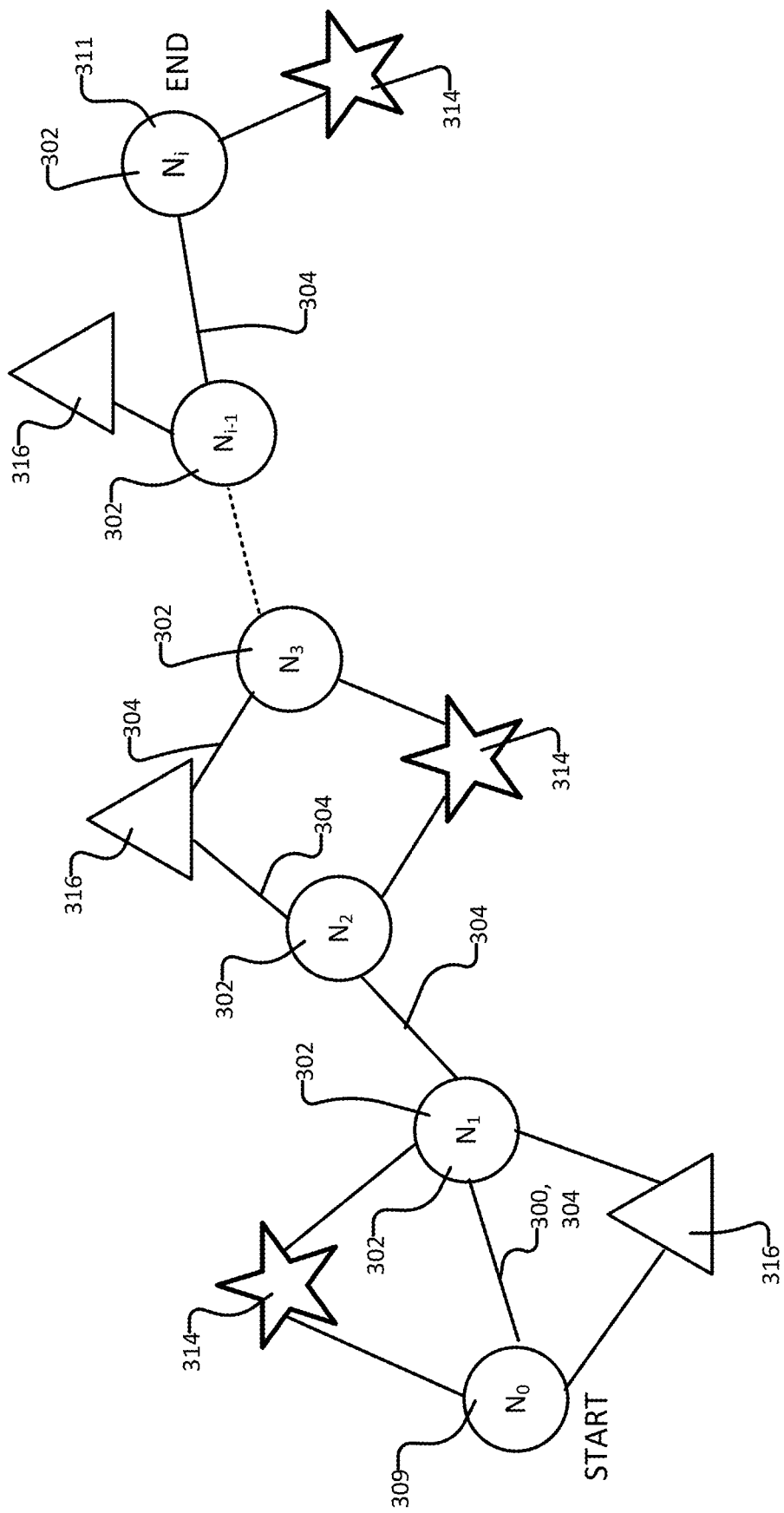
FIG. 5 is a schematic depiction of a path on which a user can guide the FIG. 1 autoscrubber in a first run and the FIG. 1 autoscrubber can implement autonomously in second and subsequent runs.

FIG. 5 shows an example path 300 along which an operator may guide autoscrubber 101 in state B. In the example path 300 of FIG. 5, an operator guides autoscrubber 101 along the path 300 from start 309 to end 311. Data from the various sensors are recorded. In some embodiments, the various sensors include odometry sensors 114, 115 (e.g. encoders relating to the rotational characteristics of wheels 102, 104), forward and upward facing camera(s) 119 (see FIGS. 1A, 1B, 1C) for recording visual features or cues from the ceiling, walls, and objects in the environment, inertial measurement units, range sensors 121 (e.g. laser scanners, depth sensors (e.g. infrared projection cameras), sonars, infrared range finders and/or the like) and/or the like. FIG. 5 also depicts visual cues 314 in the environment (represented as stars in FIG. 5) and structures 316 in the environment (represented as triangles in FIG. 5). It will be appreciated that structures 316 in the environment provide feedback for range sensors 121 and may also provide visual cues for cameras 119. In terms of processing or otherwise dealing with the data received from the various sensors, LNS 202 may parse this data into a series of discrete nodes 302 along path 300. Path 300 may be broken down in terms of segments 304 between nodes 302. Each segment 304 has a start node 302 and end node 302, with the end node 302 of one segment 304 being the start node 302 of the next segment 304. In the exemplary path 300 shown in FIG. 5, nodes 302 are numbered $N_1, N_2, N_3 \ldots N_{i-1}, N_i$.

For each node 302, LNS 202 records sensor data which may include, without limitation: odometry values, accelerometer data, laser scans, point clouds, depth information, range data relating to structures 316 detected by range sensors 121, the identity of visual features 314 observed by camera(s) 119, where the visual features 314 are located in the field of view of camera(s) 119 and/or relative to the autoscrubber 101, the orientation of the visual features 314 relative to the orientation of autoscrubber 101, and/or the like. In some embodiments, the various characteristics of visual features 314 may be identified or otherwise determined using suitable image processing tools, such as, by way of non-limiting example, OpenCV and/or the like. OpenCV is an open source computer vision and machine learning software library. Features 314 that are typically detected using OpenCV include those with high image contrast, such as corners and/or the like. Techniques for using OpenCV and the detection of visual features 314 using OpenCV and/or other computer vision techniques are well known by those skilled in the art. In some embodiments, consecutive laser scans (or other range sensors) 121 captured in a plane can be processed to create one or more two-dimensional grid maps. A laser scan is a set of range measurements that originate from the same point and can be acquired via a LIDAR (Light, Imaging, Detection And Ranging) sensor. Many existing techniques for generating two-dimensional grid maps (such as iterative closest point, pose graph SLAM (Simultaneous Localization And Mapping) and/or the like) using information from laser scans (or other range sensors) 121 are well known by those skilled in the art. As explained in more detail below, the data recorded at each node 302 may be used in the repeat mode. Processing of sensor data into nodes 302 along path 300 can take place in real time (e.g. while the operator is manually controlling autoscrubber 101 in manual operational mode) and/or at the conclusion of the teach phase in state C (FIG. 3). In state C, the operator informs LNS 202 that autoscrubber 101 is at end of path 300. Path 300 (and in particular the data associated with each node 302) is saved to memory accessible to LNS 202 and stored for future use.

Repeat mode starts in repeat mode initialization state D, where an operator informs LNS 202 what path 300 to follow (it being appreciated that LNS 202 may store (or have access to suitable memory which stores) a library of paths 300). The operator may also position autoscrubber 101 on (or near) the selected path 300. In some embodiments, the operator positions the autoscrubber 101 at the beginning of path 300. If it is the case that the operator wishes to start the autoscrubber 101 at an arbitrary location along the path 300, the LNS 202 may, in some embodiments, automatically determine its position along the selected path 300 by searching through its node data, or receive an input from the operator (through a suitable user interface such as a map), the starting position of the autoscrubber 101 along the path 300. LNS 202 then progresses to state E, where LNS 202 reads in current sensor data (e.g. odometry data, visual data from camera(s) 119, range data from range sensors 121 (e.g. LIDAR) and/or the like) and compares the current sensor data to what it expects to observe at each node 302 along the selected path 300. Using correspondences between the currently observed sensor data and the stored reference sensor data at each node 302 along the selected path 300, LNS 202 determines a particular node 302 along the selected path 300 (e.g. the node to which autoscrubber 101 is most proximate) to be its start node 302 and localizes autoscrubber 101 relative to this start node 302. In some embodiments, such correspondences are found between visual cues 314 or features identified from within image data captured by forward facing or upwardly oriented camera(s) 119. In some embodiments, such correspondences may be found from range cues 316 ascertained by range sensor(s) 121 being matched with one or more two-dimensional maps. Some embodiments may combine both visual and range cues 314, 316. Visual cues 314 may include, for example, visually unique tags (which may be distributed in the environment to be cleaned) and/or naturally occurring visual features in the image space corresponding to the environment to be cleaned. Range cues 316 may include, for example, measurements captured in a single plane (from a scanning laser or other range sensor(s) 121) and/or arbitrary measurements from sonar or infrared sensors (e.g. point clouds from depth cameras and/or the like).

Figure 6B:
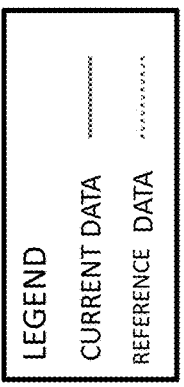
FIGS. 6A-6D (collectively, FIG. 6) are schematic depictions of image data captured by the camera of the FIG. 1 autoscrubber and how such image data can be compared to saved feature data to guide the autoscrubber during autonomous operation according to a particular embodiment.
Figure 6B:
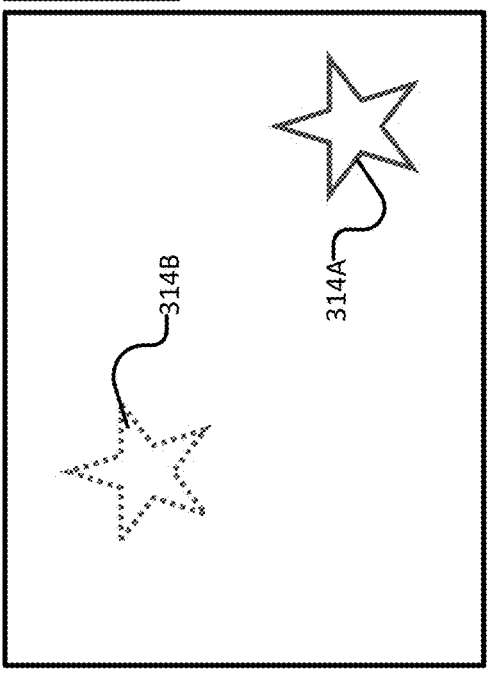
Figure 6D:
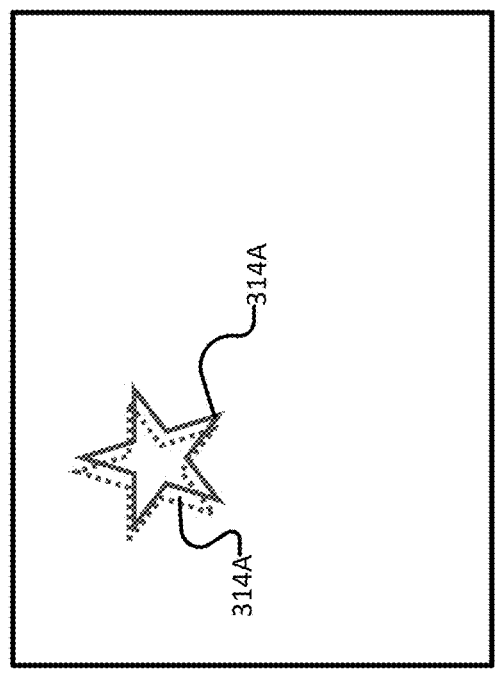
Figure 6A:
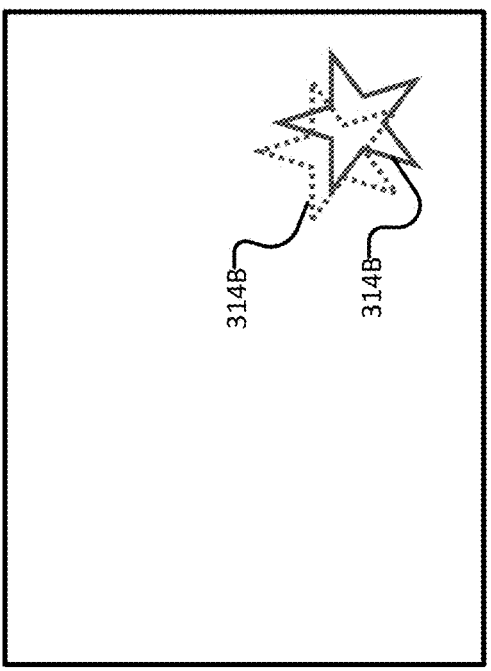

LNS 202 finds correspondences between the current sensor data and the reference data recorded that it expects to observe in the vicinity of the start node 302 and begins to track these correspondences in state E. Depending on the embodiment, the data correspondences may be based on visual features 314, range cues 316 and/or the like. This localization step is shown schematically in FIG. 6A using a single visual cue 314 as an example. As shown in FIG. 6A, autoscrubber 101 is not exactly at the location of the start node 302. This can be seen in FIG. 6A by the difference between the currently observed visual cue 314A and the reference visual cue 314B which corresponds to start node 302.

In some embodiments, such as the illustrated embodiment of FIG. 3, LNS 202 may effect a control strategy (based on the difference between the currently observed visual cue 314A and the reference visual cue 314B corresponding to a start node 302 (i.e. the node at a beginning of a segment 304) to bring autoscrubber 101 to a more precise location of such start node 302. Based on this control strategy, LNS 202 then sends the appropriate wheel velocity commands (reference signals 203, 205) to steering system 100 to effect movement of autoscrubber 101 toward the start node 302. After identifying the features LNS 202 expects to see and either guiding autoscrubber 101 back to start node 302 or determining that autoscrubber 101 is sufficiently close to start node 302, LNS 202 changes the current node from the start node 302 to the next node 302 along a selected path 300 and advances to state F.

Figure 6C:
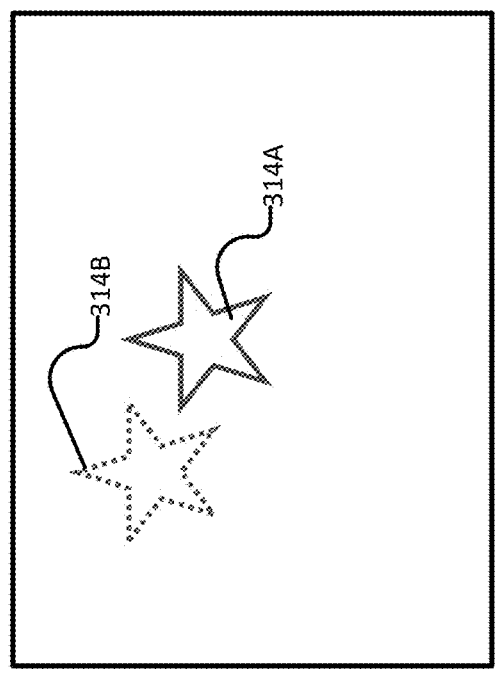

In state F, LNS 202 reads in current sensor data and compares what it currently observes to what it expects to observe at the next node 302 in the selected path 300. This process is shown schematically in FIG. 6B, where a currently observed visual cue 314A is shown as being relatively distal from the reference visual cue 314B corresponding to the next node 302 on the selected path. Based on the correspondences between the currently observed visual cue 314A and the reference visual cue 314B at the next node, LNS 202 determines a suitable control strategy to advance autoscrubber 101 to the next node 302 on the selected path 300. Based on this control strategy, LNS 202 then sends the appropriate wheel velocity commands (reference signals 203, 205) to steering system 100 to effect movement of autoscrubber 101 toward the next node 302. As autoscrubber 101 moves toward the next node 302, the current observed data (e.g. currently observed visual cue 314A) begins to match more closely with the reference data (e.g. reference visual cue 314B for the next node 302), as shown in FIG. 6C. When correspondences between current sensor data (e.g. currently observed visual cue 314A) and reference data (e.g. reference visual cue 314B for the next node 302) is sufficient to satisfy one or more proximity criteria (as shown in FIG. 6D), LNS 202 considers that autoscrubber 101 has reached the next node 302 and LNS 202 returns to state E where LNS 202 updates to the next node 302 on the selected path before returning again to state F. If the selected path 300 is completed (i.e. autoscrubber reaches the end node 302 of the selected path 300 in state F), LNS 202 advances to state H. In state H, LNS 202 recognizes that it has completed the end of the selected path 300 and the navigation operation is terminated.

In some circumstances, the control strategy developed by LNS 202 may fail (state G). By way of non-limiting example, LNS 202 could enter state G if LNS 202 determines that, despite movement of autoscrubber 101 in accordance with its control strategy, the currently observed data (e.g. visual cue 314A) is not getting closer to the reference data (e.g. visual cue 314B) corresponding to the next node 302. A suitable proximity thresholding inquiry may be used to determine that the navigation has failed. For example, if, for any group of n control iterations, a distance metric between the currently observed data (e.g. visual cue 314A) and the reference data (e.g. visual cue 314B) is not decreasing, then LNS 202 may determine that it is in a failure state (state G). Another example of a circumstance in which LNS 202 may enter state G is where LNS 202 is unable to track visual features 314 and/or range cues 316, which could be caused by any number of reasons, such as an object occluding the camera(s) 119 or range sensor(s) 121, insufficient lighting to pick out visual features 314 or range cues 316, visual features 314 or range cues 316 being occluded, visual features 314 or range cues 316 being removed from the environment and/or the like.

In state G, LNS 202 may take a number of suitable actions. In some embodiments, LNS 202 may utilize dead reckoning in failure state G based on odometry data. LNS 202 may operate in this dead reckoning mode until visual features 314 or range cues 316 can be found or until a set distance has been traveled, whichever occurs first. In the event that a visual feature 314 or range cue 316 has been found, LNS 202 may revert back to state E. In the event that a set distance has been travelled using dead reckoning and no visual features 314 or range cues 316 have been found, in some embodiments the LNS 202 may stop the autoscrubber 101 and notify the operator. In some embodiments, LNS 202 will cause autoscrubber 101 to stop moving and perhaps to initiate an alarm communication to an operator. In some embodiments, LNS 202 may return to state D from the failure state G to ascertain whether LNS 202 can recover itself on the selected path 300. In some embodiments, the particular action(s) taken in failure state G may depend on whether any (or how many) segments 304 along the selected path 300 have been previously navigated and/or whether (or how many times) failure state G has been reached during navigation of the selected path.

Figure 3B:
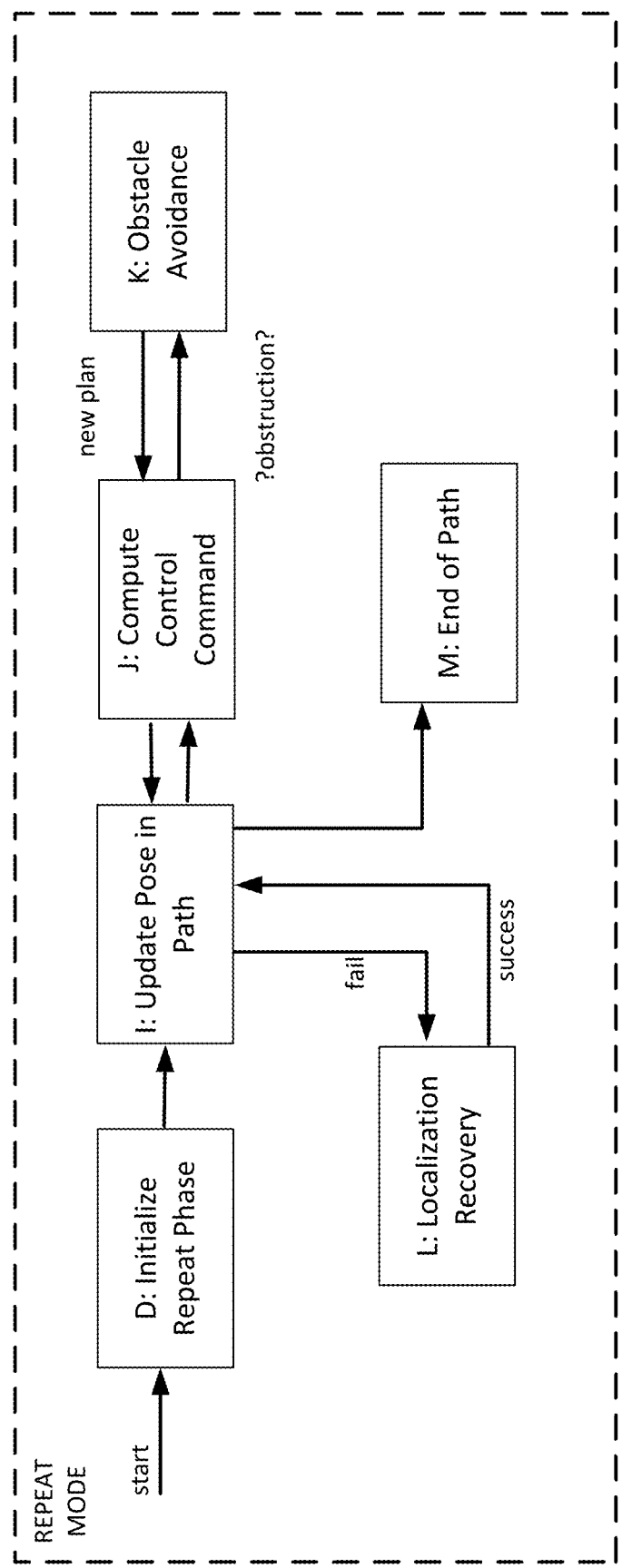
FIG. 3B depicts a state machine representation of a localization and navigation system (LNS) suitable for use with the FIG. 1 autoscrubber in a repeat mode according to another particular embodiment.

FIG. 3B depicts a state machine representation of a localization and navigation system (LNS) suitable for use with the FIG. 1 autoscrubber in a repeat mode according to another particular embodiment. The FIG. 3B repeat mode starts in state D, which is similar to state D of the FIG. 3 repeat mode—LNS 202 obtains from memory a selected path 300 and a map of reference data associated with the selected path 300. This map of reference data may include data previously sensed in a teach mode, including, for example, visual features 314, range cues 316 and/or the like associated with the selected path 300 and each of its nodes 302. In this sense, the map contemplated in the FIG. 3B repeat mode is a global representation of the selected path. The FIG. 3B repeat mode then progresses to state I which involves updating the location or pose (location and orientation) of autoscrubber 101 with respect to the map associated with the selected path 300 and with respect to the individual nodes 302 on the selected path 300. For the remaining description of FIG. 3B, the term pose of autoscrubber 101 is used for brevity, but in some embodiments, the location of autoscrubber 101 could be used instead of its pose.

To estimate the pose of autoscrubber 101 with respect to the map associated with the selected path 300, LNS 202 may use current sensor data (e.g. obtained from any of sensors 114, 115, 119, 121 and/or any other suitable sensors (e.g. other odometry sensors)), a prior pose (which may have been determined in a previous iteration or in the state D initialization) and the map data ascertained during the teach mode. Based on this data, LNS 202 may localize autoscrubber 101 (e.g. determine the current pose of autoscrubber 101) within the map 300. One non-limiting method for localizing autoscrubber within the map of the selected path involves the use of Adaptive Monte Carlo Localization (AMCL). State I may also involve localizing autoscrubber 101 (e.g. determine the current pose of autoscrubber 101) with respect to the individual nodes 302 on the selected path 300. To estimate the pose of autoscrubber 101 with respect to the individual nodes 302 associated with the selected path, LNS 202 may use current sensor data (e.g. obtained from any of sensors 114, 115, 119, 121 and/or any other suitable sensors (e.g. other odometry sensors)), a prior pose (which may have been determined in a previous iteration or in the state D initialization) and the node data ascertained during the teach mode. The data associated with each node 302 may comprise pose information relative to the map.

The localization procedure with respect to the individual nodes 302 in the selected path that takes place in state I of the FIG. 3B repeat mode may involve deciding when LNS 202 should start tracking observations against the next node 302 in the selected path 300—i.e. when LNS 202 should decide to make the next node 302 in the selected path 300 its "current node" 302. FIGS. 9A and 9B schematically illustrate one technique which may be used by LNS 202 for deciding when to start tracking the reference observations from the next node 302 in a selected path 300 (i.e. when to update the current node 302) according to a particular embodiment. In particular, FIGS. 9A and 9B show autoscrubber 101, a vector 270 oriented along the selected path 300 between the current node $N_i$ and the next node $N_{i+1}$ on the selected path 300, a vector 272 between autoscrubber 101 and the current node $N_i$ and a vector 274 which represents a projection of the vector 272, Projection vector 274 maintains the orientation of vector 272. FIGS. 9A and 9B also show an angle $\alpha$ between the vectors 270 and 274. LNS 202 may decide to update the current node from node $N_i$ to node $N_{i+1}$ when the angle $\alpha$ between the vectors 270 and 274 is greater than or equal to 90° (i.e. $\alpha >= \pi/2$). Accordingly, in the configuration of FIG. 9A, the current node would be $N_i$, but when autoscrubber 101 reaches the position shown in FIG. 9B, LNS 202 would update the current node to be node $N_{i+1}$. Some embodiments may additionally or alternatively employ a maximum likelihood filter over all, or a subset, of nodes 302 in the selected path 300 to decide which node 302 should be the current node 302 for LNS to track. If there is no next node to track, then the selected path 300 is completed, LNS 202 advances to state M. In state M, LNS 202 recognizes that it has completed the end of the selected path 300 and the navigation operation is terminated.

Assuming that there is a next node 302 to track after localization with respect to the map and with respect to the individual nodes 032 on the selected path 300 is complete in state I (i.e. autoscrubber 101 is not at the end of the path 300), LNS 202 advances to state J. State J involves the use of a control strategy to determine the reference velocity signals 203, 205 which are used to then control the speeds of wheels 102, 104 and to steer autoscrubber 101. As discussed above, these reference velocity signals 203, 205 may be used by controller 116 to compute control signals 207, 209, 211 (e.g. by one of the control systems/algorithms shown in FIG. 10 or 11). The determination of control signals 207, 209, 211 may also take place in state J of the FIG. 3B depiction. In one particular embodiment, the state J control strategy involves the use of two error values: an orientation error (related to the difference between a current heading or orientation of autoscrubber 101 and a desired path heading); and a lateral error (related to the difference between the current position of autoscrubber 101 projected onto the selected path 300). Minimizing lateral error attempts to ensure autoscrubber 101 stays on the selected path 300 and minimizing orientation error attempts to ensure autoscrubber 101 is heading in the right direction along the selected path 300. In some embodiments, the state J control strategy involves implementing an angular velocity control signal for an angular velocity about a vertical axis by combining the values from the two sources of error and constructing, from this combined error, an angular velocity control signal. In some embodiments, the state J control strategy involves allowing the forward velocity (e.g. the velocity implemented by positive torque mechanism 106) to remain constant. The angular velocity control signal (determined from the combined error using a PID control scheme) may then be mapped to wheel velocity reference signals 203, 205 based on a kinematic model of autoscrubber 101. As will be understood to those skilled in the art, this kinematic model may be based on the geometry of autoscrubber 101, characteristics of the wheels 102, 104, the steering torque mechanisms 108, 109 and the like.

Some embodiments of the state J control strategy implementation may involve incorporating additional information about the curvature of the selected path 300 (e.g. in addition to the orientation error and lateral error). Adding a dependency on the control strategy on the curvature of the selected path 300 may help to anticipate turns and may thereby help to reduce over/under steering. The use of such curvature information involves the determination of curvature either a priori or at run time. In some embodiments, this control signal B may be determined according to:

$$B = k_1 L \frac{\sin(a)}{a} + k_2 \text{ a sign}(v) + k_3 \left( \frac{c \cos(a)}{(1 - Lc)} \right) \quad (4)$$

and then scaling the control signal B by the forward velocity to arrive at the angular velocity control signal w according to:

$$w = Bv \quad (5)$$

where w is the angular velocity control signal, v is the forward velocity, L is the lateral error, a is the orientation error, c is the curvature term, and $k_1$ $k_2$, $k_3$ are configurable gains, Autoscrubber 101 will typically have kinematic constraints. Exemplary constraints may include minimum/maximum velocities for wheels 102, 104, left and right wheels 102, 104 cannot rotate in different angular directions, the angular velocities of left and right wheels 102, 104 must be greater than zero and/or the like. Such constraints can be added to the state J control strategy by checking if a constraint would be violated and then scaling the output command (angular velocity w) such that the constraint is satisfied. For example, accommodating such constraints may involve:

$$w = YBv \quad (6)$$

$$Y = \min\{1, p_i\} \text{ for all } i | p_i > 0 \quad (7)$$

where Y is a further scaling factor and $p_i$ is a constraint of the form:

$$p_i = \frac{\text{(velocity constraint)}}{\text{(control value)}} \quad (8)$$

and "control value" is w prior to multiplication by the scaling factor Y.

In some circumstances, a path 300 determined during teach mode is noisy or jittery (eg. non-smooth). Such noisy paths may produce correspondingly noisy orientation and lateral error measurements and curvature estimates during autonomous navigation. To assist LNS 202, some embodiments may involve smoothing the points that make up the paths 300 learned in teach mode, which ultimately results in a smoother control signal w and correspondingly smoother velocity reference values 203, 205. One technique to smooth a path 300 is to compute the weighted mean for each (x, y) position in the path based on a set of neighboring points (e.g. points within some threshold distance of a given point). The performance of this technique is subject to the variance of noise and distribution of points. Another technique to smooth a path 300 involves the use of a non-parametric regression method, such as locally weighted scatterplot smoothing (LOESS), and fitting a polynomial to the path. By independently fitting polynomials to the X positions and Y positions of the path a smooth function can be produced over the entire path. This has the nice property of having continuous derivatives, which is useful for curvature approximation for the robot controller.

As discussed above, the angular velocity control signal w determined in state J may then be mapped to wheel velocity reference signals 203, 205 based on a kinematic model of autoscrubber 101. State J may then involve using wheel velocity reference signals 203, 205 to determine suitable control signals 207, 209, 211 for steering torque mechanisms 108, 109 and for positive torque mechanism 106. LNS may then return to state I.

If there is an obstacle detected on the selected path 300 ahead of autoscrubber 101 (e.g. by camera(s) 119 and/or range finding sensor(s) 121), LNS 202 enters state K. Any of a variety of obstacle avoidance strategies could be executed in state K. Non-limiting examples of such obstacle avoidance techniques include planning detours (modified paths 300) around the obstacles. LNS 202 may apply heuristics, such as waiting for an obstacle to move before planning a modified path 300 and may only plan modified paths 300 in "safe" zones around the selected path 300. An example of a "safe" zone may be all locations in the map of the world where autoscrubber 101 has traversed previously (either during teach or repeat). If state K provides a modified path 300, one that is not obstructed by obstacle(s), LNS may return to state J, which implements a control strategy relative to the modified path 300.

Referring to FIG. 3B, if there is a problem with localization in state I, LNS 202 may enter state L, where LNS 202 may attempt to recover its localization. Any of a number of recovery methods could be executed in state L. For example, LNS may cause autoscrubber 101 to stop moving, notify the user, and wait. An additional or alternative method may comprise executing a global re-localization using Adaptive Monte Carlo Localization (AMCL). If the state L re-localization is successful, LNS 202 may return to state I. LNS 202 may determine (e.g. in state I) that it has reached the end node 302 of the selected path 300, or within some threshold value of the end node 302, in which case LNS 202 may enter state M. In state M, LNS 202 causes autoscrubber 101 to stop moving and may notify the operator. LNS 202 may also cause autoscrubber 101 to execute some end of path behavior—e.g. return to a particular (home) location or the like.

Figure 4:
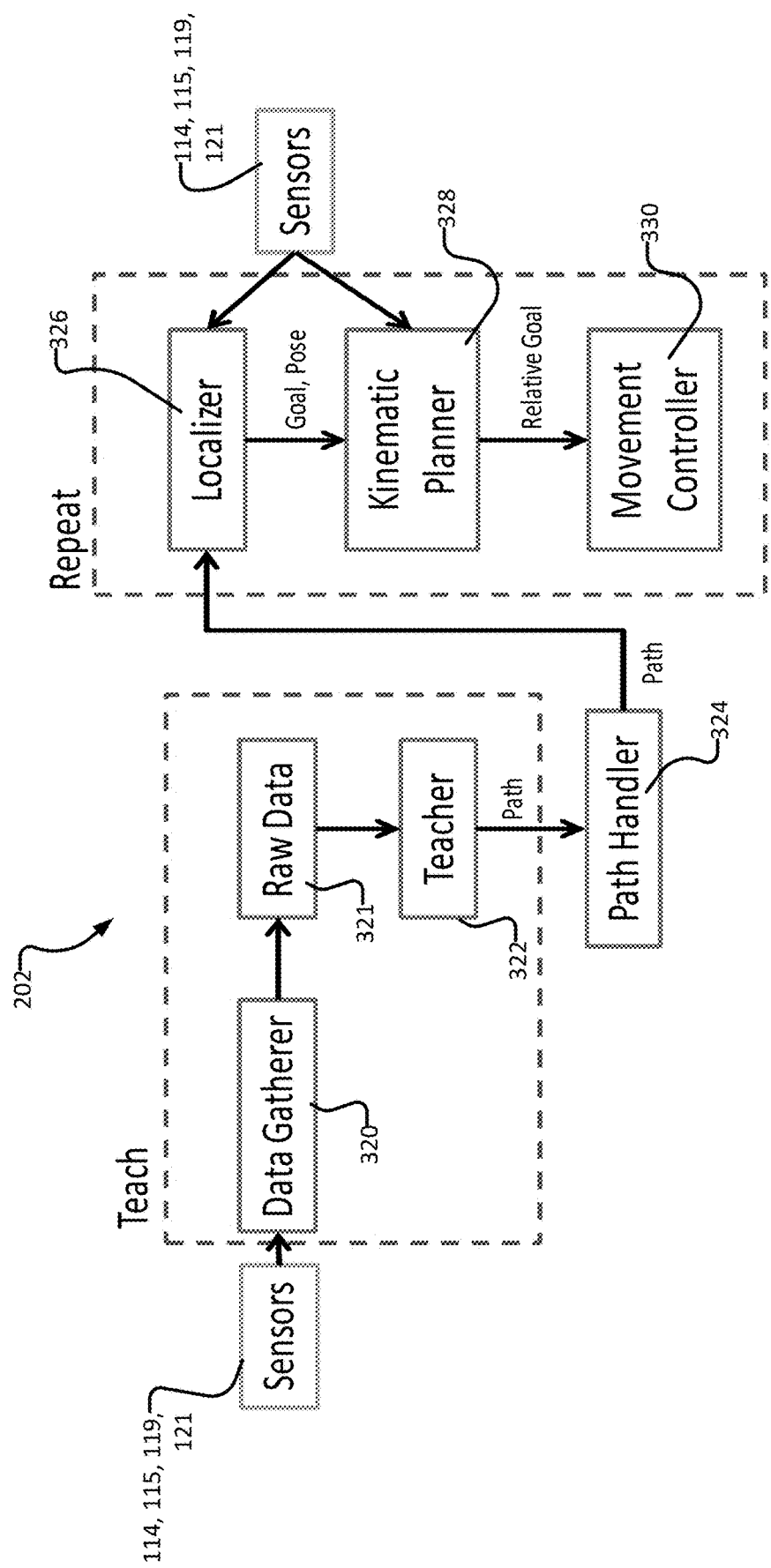
FIG. 4 is a schematic depiction of a software architecture of a LNS suitable for use with the FIG. 1 autoscrubber according to a particular embodiment.

FIG. 4 is a schematic depiction of a modular software architecture for LNS 202 according to a particular embodiment. LNS 202 has two operational modes (teach and repeat) as described above. The FIG. 4 schematic depiction shows LNS 202 divided into these operational modes, although it will be appreciated that in practice some modules may comprise the same or similar components (e.g. hardware and/or software components). Data gatherer 320 collects data from sensors 114, 115, 119, 121 and sensor filters and saves the data in persistent storage 321 (shown as raw data in FIG. 4). Teacher component 322 processes the stored data 321 into paths 300, which comprise nodes 302, as discussed above. Path handler (which may be implemented in the form of a path server) 324 saves and loads paths 300 into persistent storage (not shown) accessible to LNS 202. Optionally, data gatherer 320 may be bypassed and teacher component 322 can process the live data directly from sensors 114, 115, 119, 121. In repeat module, path localizer 326 processes data received from sensors 114, 115, 119, 121 and a selected path 300 as input to determine where autoscrubber 101 is located relative to its next objective.

Kinematic planner 328 may enforce constraints (e.g. kinematic constraints of autoscrubber 101 and/or obstacles on the selected path 300) on LNS 202. Kinematic planner 328 may have some "hard-programmed" constraints. Examples of such hard-programmed constraints include: maximum acceleration and deceleration of autoscrubber 101, maximum speed of autoscrubber 101, minimum turning radius of autoscrubber 101, wheels 102, 104 cannot rotate backwards, and/or the like. Using these constraints, kinematic planner 328 prevents LNS 202 from sending wheel velocity commands that the physical system (autoscrubber 101) cannot achieve. In addition to hard-programmed constraints, kinematic planner 328 may also take obstacles into account and may cause LNS 202 to take various alternative strategies in the face of such obstacles. Kinematic planner 328 may compute and pass left and right wheel reference velocities 203, 205 to motor controller 330 so that motor controller 330 may execute the kinematically constrained wheel commands.

Figure 4B:
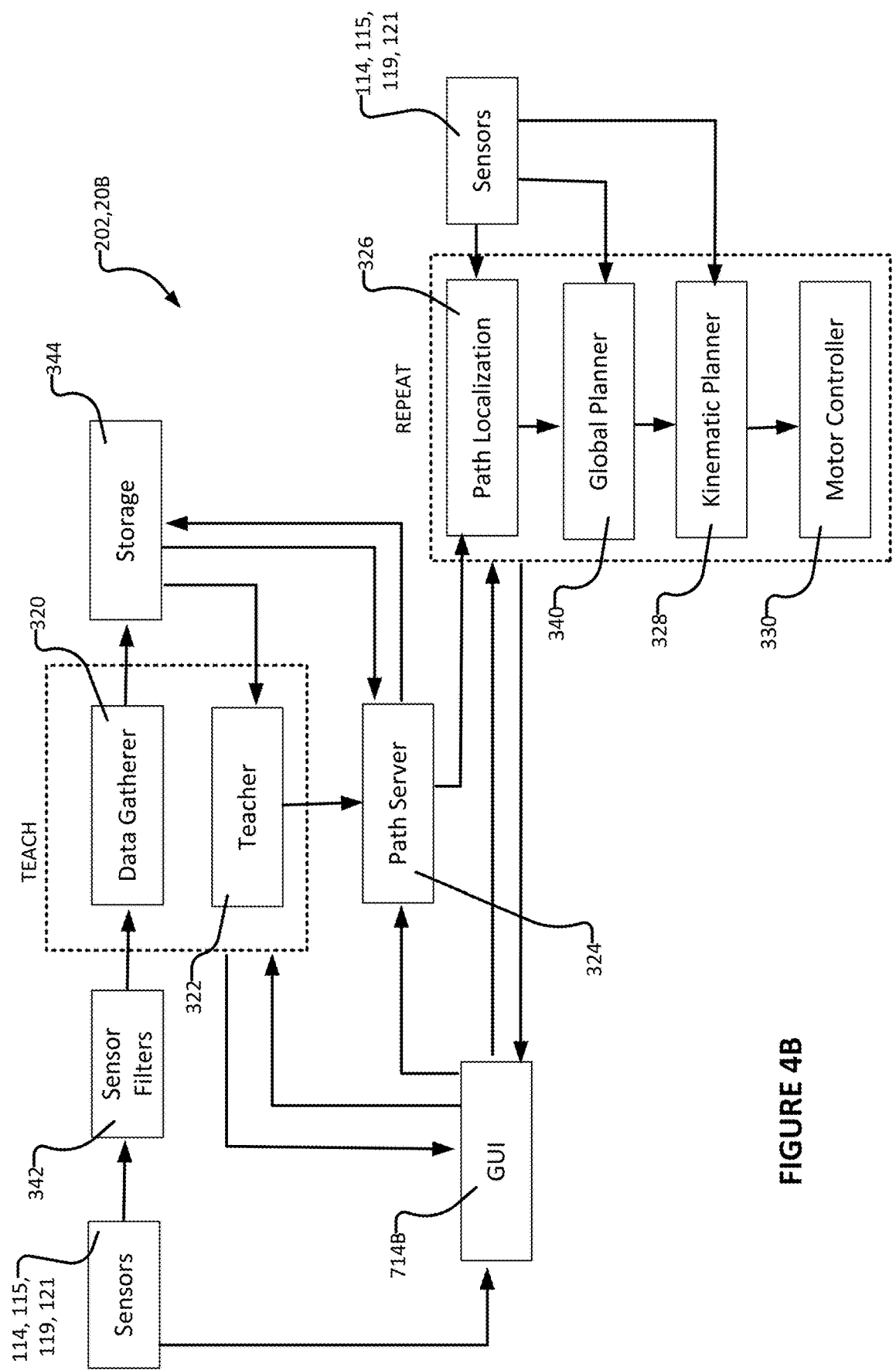
FIG. 4B depicts a software architecture of a LNS suitable for use with the FIG. 1 autoscrubber according to another particular embodiment.

FIG. 4B is a schematic depiction of a modular software architecture 202B for LNS 202 according to another particular embodiment. For the most part, the FIG. 4B software architecture 202B is substantially similar to the FIG. 4 software architecture described above and components having similar functionality are annotated in FIG. 4B using similar reference numerals. The FIG. 4B software architecture 202B differs from that of FIG. 4 in that FIG. 4B expressly shows sensor filters 342, storage 344 and user interface 714B (which are present in the FIG. 4 architecture, but omitted for brevity). The FIG. 4B software architecture 202B differs from that of FIG. 4 in that the FIG. 4B architecture 202B comprises global planner 340. Global planner 340 takes as input the path 300 from path server 324 and the current estimated pose with respect to the path 300 from the localizer component 326. Global planner 340 outputs a subset of the entire path 300 and a relative pose for the kinematic planner 328 to process. In some embodiments, global planner 340 may also perform obstacles avoidance by detecting potential obstacles blocking the desired path for autoscrubber 101 and planning detours around the obstacles. Global planner 340 may apply heuristics such as waiting for an obstacle to move before planning a detour and only plan detours in "safe" zones around the path 300. An example of a "safe" zone may be all locations in the map of the world where autoscrubber 101 has traversed previously (either during teach or repeat).

While a number of exemplary aspects and embodiments are discussed herein, those of skill in the art will recognize certain modifications, permutations, additions, and subcombinations thereof. For example:

- In the illustrated embodiment described above, autoscrubber 100 comprises a pair of drive wheels 102, 104. In some embodiments, autoscrubber 100 may comprise more than two drive wheels. In some embodiments, in addition to its drive wheels, autoscrubber 100 may comprise any suitable number of idler wheels. Such idler wheels may rotate independently. In some embodiments, such idler wheels are mounted using castor mountings or the like which facilitate pivotal movement of the horizontal idler wheel axes (e.g. the axes about which the idler wheels rotate) about generally vertically oriented axes.
- The embodiments described for the most part herein are described in connection with autoscrubbers. In some embodiments, the any of the technology described herein can be used for other robotic vehicle apparatus capable of operating in a manual mode wherein an operator steers the robotic vehicle apparatus and an autonomous mode wherein the robotic vehicle apparatus steers itself independently of the operator.
- In the embodiments described for the most part herein, when the autoscrubber is in a manual operational mode, the operator steers the autoscrubber by directly applying force to a handle or the like which is physically connected to the autoscrubber and to transfer lateral force to the autoscrubber which may in turn result in the drive wheels rotating with different angular velocities. In some embodiments, autoscrubbers may comprise more complex manual mode steering mechanisms. Some such manual mode steering mechanisms be used by an operator to change the orientation of drive wheels or to exert lateral force to the drive wheels. Some such manual mode steering mechanisms be used by an operator to provide different left and right drive torques to the left and right drive wheels. In some embodiments, an operator may be present in a vicinity of the autoscrubber when operating the autoscrubber in manual mode. For example, an operator may be present at the autoscrubber to push on the handle or may ride on the autoscrubber and exert force on the steering mechanism. This is not necessary. In some embodiments the operator may control the autoscrubber in manual operational mode using a remote user interface—e.g. remote user interfaces 252, 254 shown in FIG. 8.
  - In some embodiments, two motors may be used in a differential configuration to implement both forward movement and steering. An example of such an embodiment is shown in FIG. 12, which shows an autoscrubber 500 having a combined steering and drive system 501 comprising two independently controllable drive and steering torque mechanisms 508, 509—comprising corresponding motors 508A, 509A suitable connected to independently drive wheels 502, 504. A controller 516 may be used to supply control signals to drive and steering torque mechanisms 508, 509 to independently control the rotational velocities of wheels 502, 504 based on feedback from rotational sensors 514, 515. In many respects, operation of autoscrubber 500 may be similar to that of autoscrubber 101 described herein, except that, in autonomous operational mode, the determination of positive torque and steering torque may be combined in a closed loop control mechanism. In manual operational mode, controller may implement a "freewheeling" control strategy to permit wheels 502, 504 to "freewheel" (in a manner similar to the freewheeling techniques described above) in a suitable region around some positive torque offset. For example, if an operator sets a forward velocity to be x, then controller 516 may implement a freewheeling technique in a region around this velocity x, so that the operator has an experience where the operator is not caused to do extra work to turn autoscrubber 500 by causing a velocity that is in a region around x. For example, rotational sensors could be configured to measure angular velocities of the left and right drive wheels and to provide these measurements to the controller. While operating in the manual operational mode, an operator may set nominal left and right positive drive signals for torque mechanisms 508, 509 (and corresponding nominal angular velocities for wheels 502, 504) via a user interface, but the operator may then steer the apparatus so that drive wheels 502, 504 have actual angular velocities that are different than their nominal angular velocities. Controller 516 may be configured to determine left and right freewheeling adjustments and to apply the left and right freewheeling adjustments to the nominal left and right positive drive signals to obtain resultant left and right positive drive signals. When these resultant drive signals are applied to left and right torque mechanisms 508, 509, these resultant drive signals cause the positive torque mechanisms 508, 509 to rotate wheels 502, 504 with the actual angular velocities which simulate a freewheeling effect that minimizes the need to apply differential torque to drive wheels 502, 504 to cause them to rotate at angular velocities other than the nominal angular velocities. This freewheeling methodology may simulate the transaxle of conventional autoscrubbers.
- In some embodiments, the steering system does not require steering torque mechanisms 108, 109. Some such embodiments may instead comprise another steering wheel or wheels (not shown) at some suitable distance behind or in front of the drive axle of drive wheels 102, 104. Example embodiments of such a system may comprise any one or more of:
  - One or more steering wheel(s) (caster-mounted or otherwise) which may replace existing caster wheels or which may be additions to existing caster wheels. Such one or more steering wheel(s) can be controllably and actively steered by a suitable steering mechanism to control the orientation of the steering wheel(s) and the corresponding direction of the autoscrubber 101. Such steering wheel(s) may be powered (in the sense that they also act like drive wheels) or unpowered.

One or more omniwheel(s) mounted perpendicular to drive wheels 102, 104 at some distance behind (or in front of) the drive axle of drive wheels 102, 104, which can be driven in either transverse direction to change the direction of autoscrubber 101, but which do not provide substantial resistance to forward or backward movement.

In any such embodiments incorporating steering wheels, the steering wheel(s) may be configured to permit free rotation (e.g. "freewheeling") either via mechanical disconnection of the wheel or using a freewheeling control mechanism of the type described herein.

What is claimed is:

1. A robotic vehicle apparatus operable in a manual mode wherein an operator steers the robotic vehicle apparatus and an autonomous mode wherein the robotic vehicle apparatus steers itself independently of the operator, the robotic vehicle apparatus comprising:
   a chassis supporting a left drive wheel and a right drive wheel for rotation with respect to the chassis;
   a positive torque mechanism mounted to the chassis and connected to provide left positive driving torque to the left drive wheel and to provide right positive driving torque to the right drive wheel to thereby move the apparatus; and
   a steering system embodied separately from the positive torque mechanism, the steering system mounted to the chassis for steering the apparatus when the apparatus is in an autonomous operational mode, the steering system comprising:
   a left steering torque mechanism connectable to apply left steering torque to the left drive wheel independently of the right drive wheel;
   a right steering torque mechanism connectable to apply right steering torque to the right drive wheel independently of the left drive wheel; and
   a controller connectable to provide a positive torque drive signal to the positive torque mechanism, a left steering torque signal to the left steering torque mechanism and a right steering torque signal to the right steering torque mechanism when the apparatus is in the autonomous operational mode and configured to controllably steer movement of the apparatus when the apparatus is in an autonomous operational mode by determining the left steering torque signal and the right steering torque signal and providing these left and right steering torque signals to the left and right steering torque mechanisms.

2. A robotic vehicle apparatus according to claim 1 wherein a single positive torque motor is connected to a transaxle which is in turn connected to the left and right drive wheels to thereby split the positive driving torque between the left drive wheel and the right drive wheel.

3. A robotic vehicle apparatus according to claim 1 wherein the positive torque mechanism comprises a left positive torque motor connected to provide the left positive driving torque to the left drive wheel and a right positive torque motor connected to provide the right positive driving torque to the right drive wheel.

4. A robotic vehicle apparatus according to claim 1 wherein the left steering torque mechanism comprises a left negative steering torque mechanism which is connectable to apply left negative steering torque to the left drive wheel, the left negative steering torque acting to decelerate any rotation of the left drive wheel with respect to the chassis and wherein the right steering torque mechanism comprises a right negative steering torque mechanism which is connectable to apply right negative steering torque to the right drive wheel, the right negative steering torque acting to decelerate any rotation of the right drive wheel with respect to the chassis.

5. A robotic vehicle apparatus according to claim 4 wherein the controller is configured to steer the apparatus when the apparatus is in the autonomous operational mode by determining the left and right steering torque signals to be different from one another and by providing these different left and right steering torque signals to the left and right negative steering torque mechanisms to thereby cause the left and right negative steering torque mechanisms to apply different amounts of left negative steering torque to the left drive wheel and right negative steering torque to the right drive wheel.

6. A robotic vehicle apparatus according to claim 4 wherein the left and right steering torque mechanisms respectively comprises left and right steering motors which are mechanically connectable to the left and right drive wheels.

7. A robotic vehicle apparatus according to claim 6 wherein the left steering motor is mechanically connectable to the left drive wheel by a left braking mechanism which is connectable to the left drive wheel when the apparatus is in the autonomous operational mode and which is mechanically disconnected from applying left negative steering torque to the left drive wheel when the apparatus is in the manual operational mode and the right steering motor is mechanically connectable to the right drive wheel by a right braking mechanism which is connectable to the right drive wheel when the apparatus is in the autonomous operational mode and which is mechanically disconnected from applying right negative steering torque to the right drive wheel when the apparatus is in the manual operational mode.

8. A robotic vehicle apparatus according to claim 6 wherein the left steering motor is mechanically connectable to the left drive wheel by a left steering mechanism comprising a left runner wheel which is connectable to the left drive wheel by friction to cause the left runner wheel to rotate with the left drive wheel when the apparatus is in the autonomous operational mode and the right steering motor is mechanically connectable to the right drive wheel by a right steering mechanism comprising a right runner wheel which is connectable to the right drive wheel by friction to cause the right runner wheel to rotate with the right drive wheel when the apparatus is in the autonomous operational mode.

9. A robotic vehicle apparatus according to claim 8 wherein application of left and right negative steering torque to the left and right drive wheels rotates the left and right steering motors through the friction connection of the left and right runner wheels to the left and right drive wheels, and rotation of the left and right steering motors generates energy, the generated energy connectable to a charge storage device.

10. A robotic vehicle apparatus according to claim 6 wherein the left steering motor is mechanically connectable to the left drive wheel by a left steering mechanism comprising a left chain mechanism and the right steering motor is mechanically connectable to the right drive wheel by a right steering mechanism comprising a right chain mechanism.

11. A robotic vehicle apparatus according to claim 1 wherein the left steering torque mechanism is configurable, by positive and negative left steering torque signals, to apply: left positive steering torque to the left drive wheel, the left positive steering torque acting to accelerate any rotation of the left drive wheel with respect to the chassis; and left negative steering torque to the left drive wheel, the left negative steering torque acting to decelerate any rotation of the left drive wheel with respect to the chassis and wherein the right steering torque mechanism is configurable, by positive and negative right steering torque signals, to apply: right positive steering torque to the right drive wheel, the right positive steering torque acting to accelerate any rotation of the right drive wheel with respect to the chassis; and right negative steering torque to the right drive wheel, the right negative steering torque acting to decelerate any rotation of the right drive wheel with respect to the chassis.

12. A robotic vehicle apparatus according to claim 11 wherein the controller is configured to steer the apparatus when the apparatus is in the autonomous operational mode by determining the left and right steering torque signals to be different from one another and by providing these different left and right steering torque signals to the left and right steering torque mechanisms to thereby cause the left and right steering torque mechanisms to apply different amounts of left steering torque to the left drive wheel and right steering torque to the right drive wheel.

13. A robotic vehicle apparatus according to claim 11 wherein the left and right steering torque mechanisms respectively comprise left and right steering motors which are mechanically connectable to the left and right drive wheels.

14. A robotic vehicle apparatus according to claim 13 wherein the left steering motor is mechanically connectable to the left drive wheel by a left steering mechanism comprising a left runner wheel which is connectable to the left drive wheel by friction to cause the left runner wheel to rotate with the left drive wheel when the apparatus is in the autonomous operational mode and the right steering motor is mechanically connectable to the right drive wheel by a right steering mechanism comprising a right runner wheel which is connectable to the right drive wheel by friction to cause the right runner wheel to rotate with the right drive wheel when the apparatus is in the autonomous operational mode.

15. A robotic vehicle apparatus according to claim 1 wherein the left steering torque mechanism comprises a left positive steering torque mechanism which is connectable to apply left positive steering torque to the left drive wheel, the left positive steering torque acting to accelerate any rotation of the left drive wheel with respect to the chassis.

16. A robotic vehicle apparatus according to claim 1 comprising a user interface and wherein, in the manual operational mode, an operator controls the left positive driving torque applied to the left drive wheel and the right positive driving torque applied to the right drive wheel via left and right positive drive commands configurable by the user interface.

17. A robotic vehicle apparatus according to claim 16 wherein the controller is configured to receive the left and right positive drive commands and to provide one or more corresponding positive driving torque signals to the positive torque mechanism to cause the positive torque mechanism to provide the left and right positive driving torques to the left and right drive wheels and wherein the controller is configured to determine the one or more corresponding positive driving torque signals in an open loop manner.

18. A robotic vehicle apparatus according to claim 1 comprising a handle for steering the apparatus when the apparatus is in the manual operational mode, the handle connected to the chassis and shaped to be grippable by an operator to steer the movement of the apparatus when the apparatus is in the manual operational mode via application of force to the handle.

19. A robotic vehicle apparatus according to claim 1 comprising a manual mode steering mechanism which is manipulable by the operator when the apparatus is in the manual operational mode to exert lateral force on the left and right drive wheels and to thereby change their orientations with respect to the chassis.

20. A robotic vehicle apparatus according to claim 1 comprising a manual mode steering mechanism which is manipulable by the operator when the apparatus is in the manual operational mode to cause the positive torque mechanism to provide different left and right drive torques to the left and right drive wheels.

21. A robotic vehicle apparatus according to claim 1 comprising one or more range sensors mounted to the chassis for capturing range information in relation to objects in the environment in which the apparatus operates and wherein the controller is configured to operate in a teach mode and a repeat mode wherein:
  during the teach mode, the apparatus is in the manual operational mode and the one or more range sensors capture and store range cues at each of the plurality of nodes along a path during movement of the apparatus along the path; and
  during the repeat mode, the apparatus is in the autonomous operational mode, the one or more range sensors capture range data to provide range data feedback and the controller is configured to determine one or more of the positive torque drive signal, the left steering torque drive signal and the steering right torque drive signal, based at least in part on a comparison of the range data feedback and at least some of the range cues captured and stored at each of the plurality of nodes during the teach mode.

22. A robotic vehicle apparatus according to claim 21 wherein, during the repeat mode, the controller is configured to determine one or more of the positive torque drive signal, the left steering torque drive signal and the right steering torque drive signal, based at least in part on a comparison of the range data feedback and the range cues captured and stored for a current one of the plurality of nodes during the teach mode and wherein the current node is updated as the apparatus traverses the path.

23. A robotic vehicle apparatus according to claim 21 wherein, during the repeat mode, the controller is configured to determine one or more of the positive torque drive signal, the left steering torque drive signal and the right steering torque drive signal, based at least in part on a comparison of the range data feedback and the range cues captured and stored for a subset plurality of the plurality of nodes during the teach mode, the subset plurality of nodes corresponding to a threshold vicinity of a current location of the apparatus and the subset plurality updated as the apparatus traverses the path.

24. A robotic vehicle apparatus according to claim 21 wherein, during the repeat mode, the controller is configured to determine one or more of the positive torque drive signal, the left steering torque drive signal and the right steering torque drive signal, based at least in part on a comparison of the range data feedback and a map incorporating the range cues captured and stored for all of the plurality of nodes during the teach mode.

25. A robotic vehicle apparatus according to claim 1 comprising one or more odometry sensors and wherein the controller is configured to operate in a teach mode and a repeat mode wherein:
  during the teach mode, the apparatus is in the manual operational mode and the one or more odometry sensors capture and store reference odometry data at each of the plurality of nodes along a path during movement of the apparatus along the path; and
  during the repeat mode, the apparatus is in the autonomous operational mode, the one or more odometry sensors capture odometry data to provide odometry data feedback and the controller is configured to determine one or more of the positive torque drive signal, the left steering torque drive signal and the right steering torque drive signal, based at least in part on a comparison of the odometry data feedback and at least some of the reference odometry data captured and stored at each of the plurality of nodes during the teach mode.

26. A robotic vehicle apparatus operable in a manual mode wherein an operator steers the robotic vehicle apparatus and an autonomous mode wherein the robotic vehicle apparatus steers itself independently of the operator, the robotic vehicle apparatus comprising:
  a chassis supporting a left drive wheel and a right drive wheel for rotation with respect to the chassis;
  a positive torque mechanism mounted to the chassis and connected to provide left positive driving torque to the left drive wheel and to provide right positive driving torque to the right drive wheel to thereby move the apparatus, wherein the positive torque mechanism comprises a left positive torque motor connected to provide the left positive driving torque to the left drive wheel and a right positive torque motor connected to provide the right positive driving torque to the right drive wheel;
  a steering system mounted to the chassis for steering the apparatus when the apparatus is in an autonomous operational mode, the steering system comprising:
  a left steering torque mechanism connectable to apply left steering torque to the left drive wheel independently of the right drive wheel;
  a right steering torque mechanism connectable to apply right steering torque to the right drive wheel independently of the left drive wheel;
  a controller connectable to provide a left steering torque signal to the left steering torque mechanism and a right steering torque signal to the right steering torque mechanism when the apparatus is in the autonomous operational mode and configured to controllably steer movement of the apparatus when the apparatus is in an autonomous operational mode by determining the left steering torque signal and the right steering torque signal and providing these left and right steering torque signals to the left and right steering torque mechanisms; and
  left and right sensors connected to measure parameters indicative of angular velocities of the left and right drive wheels and to provide these measurements to the controller, wherein, when operating in the manual operational mode: an operator sets nominal left and right positive drive signals to the left and right positive torque motors via a user interface, the nominal left and right positive drive signals corresponding to nominal angular velocities of the left and right drive wheels, and then steers the apparatus so that the left and right drive wheels have actual left and right angular velocities that are different than the nominal angular velocities; and the controller is configured to determine left and right freewheeling adjustments and to apply the left and right freewheeling adjustments to the nominal left and right positive drive signals to obtain resultant left and right positive drive signals which, when applied to left and right positive torque motors, cause the left and right drive wheels to rotate with the actual left and right angular velocities to thereby simulate a freewheeling effect which minimizes the need to apply differential torque to the left and right drive wheels to cause them to rotate at angular velocities other than the nominal angular velocities.

27. A robotic vehicle apparatus operable in a manual mode wherein an operator steers the robotic vehicle apparatus and an autonomous mode wherein the robotic vehicle apparatus steers itself independently of the operator, the robotic vehicle apparatus comprising:
  a chassis supporting a left drive wheel and a right drive wheel for rotation with respect to the chassis;
  a positive torque mechanism mounted to the chassis and connected to provide left positive driving torque to the left drive wheel and to provide right positive driving torque to the right drive wheel to thereby move the apparatus;
  a steering system mounted to the chassis for steering the apparatus when the apparatus is in an autonomous operational mode, the steering system comprising:
  a left steering torque mechanism connectable to apply left steering torque to the left drive wheel independently of the right drive wheel;
  a right steering torque mechanism connectable to apply right steering torque to the right drive wheel independently of the left drive wheel;
  a controller connectable to provide a left steering torque signal to the left steering torque mechanism and a right steering torque signal to the right steering torque mechanism when the apparatus is in the autonomous operational mode and configured to controllably steer movement of the apparatus when the apparatus is in an autonomous operational mode by determining the left steering torque signal and the right steering torque signal and providing these left and right steering torque signals to the left and right steering torque mechanisms; and
  one or more cameras mounted to the chassis for capturing images of an environment in which the apparatus operates wherein at least one of the one or more cameras is mounted to the chassis such that its field of view is oriented primarily upwardly for capturing images of a ceiling of the environment in which the apparatus operates; and
  one or more range sensors mounted to the chassis for capturing range information in relation to objects in the environment in which the apparatus operates.

28. A robotic vehicle apparatus operable in a manual mode wherein an operator steers the robotic vehicle apparatus and an autonomous mode wherein the robotic vehicle apparatus steers itself independently of the operator, the robotic vehicle apparatus comprising:
  a chassis supporting a left drive wheel and a right drive wheel for rotation with respect to the chassis;
  a positive torque mechanism mounted to the chassis and connected to provide left positive driving torque to the left drive wheel and to provide right positive driving torque to the right drive wheel to thereby move the apparatus;

a steering system mounted to the chassis for steering the apparatus when the apparatus is in an autonomous operational mode, the steering system comprising:

a left steering torque mechanism connectable to apply left steering torque to the left drive wheel independently of the right drive wheel;

a right steering torque mechanism connectable to apply right steering torque to the right drive wheel independently of the left drive wheel;

a controller connectable to provide a left steering torque signal to the left steering torque mechanism and a right steering torque signal to the right steering torque mechanism when the apparatus is in the autonomous operational mode and configured to controllably steer movement of the apparatus when the apparatus is in an autonomous operational mode by determining the left steering torque signal and the right steering torque signal and providing these left and right steering torque signals to the left and right steering torque mechanisms; and one or more cameras mounted to the chassis for capturing images of an environment in which the apparatus operates, and wherein the controller is configured to operate in a teach mode and a repeat mode wherein:

during the teach mode, the apparatus is in the manual operational mode and the one or more cameras capture and store image data at each of a plurality of nodes along a path during movement of the apparatus along the path; and during the repeat mode, the apparatus is in the autonomous operational mode, the one or more cameras capture image data to provide image data feedback and the controller is configured to determine one or more of a positive torque drive signal applied to the positive torque mechanism, the left steering torque drive signal and the right steering torque drive signal, based at least in part on a comparison of the image data feedback and at least some of the image data captured and stored at each of the plurality of nodes during the teach mode.

29. A robotic vehicle apparatus according to claim 28 wherein, during the repeat mode, the controller is configured to determine one or more of the positive torque drive signal, the left steering torque drive signal and the right steering torque drive signal, based at least in part on a comparison of the image data feedback and the image data captured and stored for a current one of the plurality of nodes during the teach mode and wherein the current node is updated as the apparatus traverses the path.

30. A robotic vehicle apparatus according to claim 28 wherein, during the repeat mode, the controller is configured to determine one or more of the positive torque drive signal, the left steering torque drive signal and the right steering torque drive signal, based at least in part on a comparison of the image data feedback and the image data captured and stored for a subset plurality of the plurality of nodes during the teach mode, the subset plurality of nodes corresponding to a threshold vicinity of a current location of the apparatus and the subset plurality updated as the apparatus traverses the path.

31. A robotic vehicle apparatus according to claim 28 wherein, during the repeat mode, the controller is configured to determine one or more of the positive torque drive signal, the left steering torque drive signal and the right steering torque drive signal, based at least in part on a comparison of the image data feedback and a map incorporating the image data captured and stored for all of the plurality of nodes during the teach mode.

32. A method for moving a robotic vehicle apparatus that is operable in a manual mode wherein an operator steers the robotic vehicle apparatus and an autonomous mode wherein the robotic vehicle apparatus steers itself independently of the operator, the method comprising:

providing a robotic vehicle apparatus comprising: a chassis supporting a left drive wheel and a right drive wheel for rotation with respect to the chassis; a positive torque mechanism connected to provide left positive driving torque to the left drive wheel and to provide right positive driving torque to the right drive wheel to thereby move the apparatus; a steering system embodied separately from the positive torque mechanism, the steering system mounted to the chassis for steering the apparatus when the apparatus is in an autonomous operational mode, the steering system comprising: a left steering torque mechanism connectable to apply left steering torque to the left drive wheel independently of the right drive wheel and a right steering torque mechanism connectable to apply right steering torque to the right drive wheel independently of the left drive wheel; and when the apparatus is in the autonomous operational mode:

determining, by a controller, a positive torque drive signal, a left steering torque signal and a right torque drive signal; and providing the positive torque drive signal to the positive torque mechanism, the left steering torque signal and the right torque drive signal to the left and right steering torque mechanisms to thereby controllably steer the apparatus by effecting different left and right angular velocities for the left and right drive wheels.

* * * * *